(12) United States Patent
Miyazaki et al.

(10) Patent No.: US 10,585,339 B2
(45) Date of Patent: Mar. 10, 2020

(54) DUSTPROOF APPARATUS, IMAGE DISPLAY SYSTEM, AND ATTACHMENT METHOD

(71) Applicant: SONY CORPORATION, Tokyo (JP)

(72) Inventors: Akihiro Miyazaki, Kanagawa (JP); Hironori Konno, Kanagawa (JP); Chiharu Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/780,647

(22) PCT Filed: Sep. 20, 2016

(86) PCT No.: PCT/JP2016/004269
§ 371 (c)(1),
(2) Date: Jun. 1, 2018

(87) PCT Pub. No.: WO2017/098677
PCT Pub. Date: Jun. 15, 2017

(65) Prior Publication Data
US 2018/0356712 A1 Dec. 13, 2018

(30) Foreign Application Priority Data
Dec. 10, 2015 (JP) .................. 2015-240995

(51) Int. Cl.
*G03B 21/14* (2006.01)
*G03B 21/16* (2006.01)
(Continued)

(52) U.S. Cl.
CPC ......... *G03B 21/145* (2013.01); *F16M 13/027* (2013.01); *G03B 21/16* (2013.01); *H04N 5/74* (2013.01); *H04N 9/3141* (2013.01)

(58) Field of Classification Search
CPC ........ G03B 21/14; G03B 21/16; G03B 21/20; G03B 21/145; F16M 13/00; F16M 13/02; F16M 13/022; F16M 13/027
See application file for complete search history.

(56) References Cited

U.S. PATENT DOCUMENTS

2007/0206163 A1* 9/2007 Kuroda ................ G03B 21/145
353/88
2008/0158517 A1* 7/2008 Hsiao .................... G03B 21/16
353/57
(Continued)

FOREIGN PATENT DOCUMENTS

JP 2001-228543 A 8/2001
JP 2001-343708 A 12/2001
(Continued)

OTHER PUBLICATIONS

International Search Report dated Dec. 13, 2016 in PCT/JP2016/004269.

*Primary Examiner* — Sultan Chowdhury
(74) *Attorney, Agent, or Firm* — Oblon, McClelland, Maier & Neustadt, L.L.P.

(57) ABSTRACT

A dustproof apparatus according to an embodiment of the present technology includes a base portion and a cover portion. The base portion includes a connection portion to be connected to an external attachment portion and a holding portion that holds an image display apparatus. The cover portion includes an inlet, a filter portion provided at the inlet, and an outlet that discharges air sucked in from the inlet, the cover portion being attached to the base portion such that the cover portion covers the image display apparatus held by the holding portion.

15 Claims, 13 Drawing Sheets

(51) Int. Cl.
*H04N 5/74* (2006.01)
*F16M 13/02* (2006.01)
*H04N 9/31* (2006.01)

(56) References Cited

U.S. PATENT DOCUMENTS

| | | | |
|---|---|---|---|
| 2011/0109883 A1 | 5/2011 | Ito | |
| 2011/0181845 A1* | 7/2011 | Nakashita | G03B 21/16 353/58 |
| 2011/0279788 A1* | 11/2011 | Nakajima | B01D 46/008 353/61 |
| 2012/0229988 A1 | 9/2012 | Mukaide | |
| 2012/0257172 A1* | 10/2012 | Shirakura | G03B 21/16 353/61 |
| 2013/0250252 A1* | 9/2013 | Nakano | G03B 21/14 353/79 |
| 2013/0300946 A1* | 11/2013 | Manabe | H04N 5/66 348/739 |
| 2014/0375964 A1* | 12/2014 | Tsuchiya | H04N 9/3144 353/52 |

FOREIGN PATENT DOCUMENTS

| | | |
|---|---|---|
| JP | 2003-29764 A | 1/2003 |
| JP | 2003-162005 A | 6/2003 |
| JP | 2003-233133 A | 8/2003 |
| JP | 2003-241310 A | 8/2003 |
| JP | 2009-253051 A | 10/2009 |
| JP | 2010-286750 A | 12/2010 |
| JP | 2011-103185 A | 5/2011 |
| JP | 2014-93310 A | 5/2014 |
| JP | 2015-36789 A | 2/2015 |
| WO | WO 2009/153871 A1 | 12/2009 |

\* cited by examiner

A

B

C

DUSTPROOF APPARATUS, IMAGE DISPLAY SYSTEM, AND ATTACHMENT METHOD

TECHNICAL FIELD

The present technology relates to a dustproof apparatus for preventing an influence of dust and the like on a projector and the like, an image display system including the dustproof apparatus and an image display apparatus, and an attachment method thereof.

BACKGROUND ART

Patent Literature 1 describes a filter device 2 for preventing an influence of dust, soot, and the like on a projector 3 provided in a poor environment, as shown in FIG. 1 thereof. The filter device 2 includes an external casing that includes an air intake window 10 covered by a filter unit 14, a fan 15 that blows cooling air onto the projector 3, and a discharge window 11 provided in front of a discharge port 6 of the projector 3. The projector 3 is set in the external casing 13, and these are attached to a lid plate portion connected to a ceiling hanger (both of which are not numbered) (paragraphs [0013], [0017], [0023], etc. in specification).

CITATION LIST

Patent Literature

Patent Literature 1: Japanese Patent Application Laid-open No. 2003-162005

DISCLOSURE OF INVENTION

Technical Problem

In a case where such a dustproof apparatus is attached to an image display apparatus, high workability is required in setting these apparatuses on a ceiling or the like in addition to a high dustproof effect.

In view of the circumstances as described above, an object of the present technology is to provide a dustproof apparatus, an image display system, and an attachment method that are capable of exerting high workability regarding setting on a ceiling or the like.

Solution to Problem

To attain the object described above, a dustproof apparatus according to an embodiment of the present technology includes a base portion and a cover portion.

The base portion includes a connection portion to be connected to an external attachment portion and a holding portion that holds an image display apparatus.

The cover portion includes an inlet, a filter portion provided at the inlet, and an outlet that discharges air sucked in from the inlet, the cover portion being attached to the base portion such that the cover portion covers the image display apparatus held by the holding portion.

In this dustproof apparatus, the holding portion that holds the image display apparatus is provided in the base portion, and the cover portion is attached to the base portion in a state where the image display apparatus is held by the holding portion. Therefore, it becomes possible to set the base portion in the state where the image display apparatus is held, on the ceiling or the like first, and attach the cover portion after that. As a result, it becomes possible to exert high workability regarding setting on a ceiling or the like.

The dustproof apparatus may further include a fan portion provided at the outlet.

Accordingly, a high cooling effect can be exerted.

The dustproof apparatus may further include a division portion that divides an internal space formed by attaching the cover portion to the base portion such that the cover portion covers the image display apparatus, into a first area and a second area different from the first area. In this case, the inlet may include a first suction area that sucks in the air into the first area and a second suction area that sucks in the air into the second area. Further, the filter portion may be provided in the first suction area of the inlet.

In this dustproof apparatus, the internal space is divided into the first area that sucks in clean air from which dust or the like has been removed by the filter portion and the second area that sucks in air without passing through the filter portion. Accordingly, it becomes possible to reduce a load on the filter portion as compared to a case where clean air is sucked into the entire internal space.

The image display apparatus may include a first supply port for supplying the air to an optical system including a light source and a second supply port for supplying the air to a cooling unit for cooling the light source. In this case, the division portion may perform the division into the first area and the second area such that the first supply port is included in the first area and the second supply port is included in the second area.

Accordingly, clean air that has passed through the filter portion is supplied, and thus it becomes possible to sufficiently suppress lowering of luminance or the like due to dust and the like.

The filter portion may be configured to be detachable from the inlet. In this case, the first suction area may oppose the first supply port. Further, the second suction area may oppose the second supply port.

Accordingly, by removing the filter portion, it becomes possible to easily access the first supply port at a position opposing the first suction area. As a result, for example, it becomes possible to easily exchange a filter provided at the first supply port, or the like.

The base portion may include an opening, an opening cover that covers the opening from an outer side such that a drawing port for drawing out one or more cables connected to the image display apparatus to an outside is formed, and a dustproof structure portion provided at the drawing port.

Accordingly, it becomes possible to prevent dust or the like from entering from the drawing port, and thus exert a high dustproof effect.

The drawing port may be formed between a partial circumferential portion of the opening and an opposing portion of the opening cover that opposes the partial circumferential portion. In this case, the dustproof structure portion may include a holding-side cushion member that is provided at the partial circumferential portion and includes one or more slits that respectively nip the one or more cables, and an adhesion-side cushion member that is provided at the opposing portion of the opening cover and adheres tightly to the holding-side cushion member.

By nipping the cable by the slit of the holding-side cushion member and causing the adhesion-side cushion member to adhere tightly, a high dustproof effect can be exerted.

The holding-side cushion member may include a first holding-side cushion and a second holding-side cushion.

The first holding-side cushion has a substantially-cuboid shape, includes the one or more slits that are formed from an upper surface toward a lower surface, aligned in a longitudinal direction, and extend in a short-side direction, and is arranged such that the short-side direction is set in a direction that is directed from the drawing port toward the outside.

The second holding-side cushion has a substantially-cuboid shape in which a size thereof in the longitudinal direction is substantially equal to that of the first holding-side cushion, and is arranged adjacently along an outer-side side surface of the first holding-side cushion.

In this case, the adhesion-side cushion member may adhere tightly to an upper surface of each of the first holding-side cushion and the second holding-side cushion.

By bringing the second holding-side cushion adjacent to the outer-side side surface of the first holding-side cushion in which the slit is formed and causing the second holding-side cushion member to adhere tightly to these upper surfaces, a high dustproof effect can be exerted.

A height of the upper surface of the second holding-side cushion may be smaller than a height of the upper surface of the first holding-side cushion and larger than a height of a lower end of the one or more slits formed in the first holding-side cushion.

Accordingly, a high dustproof effect can be exerted.

The cover portion may include one or more engagement portions. In this case, the base portion may include one or more temporary-fixing portions that engage with the one or more engagement portions to temporarily fix the cover portion.

Accordingly, it becomes possible to temporarily fix the cover portion to the base portion set on a ceiling or the like (while holding image display apparatus). As a result, it becomes possible to safely attach the cover portion to the base portion while preventing the cover portion from falling.

The temporary-fixing portion may include a first member and a second member.

The first member includes a protrusion portion that includes an engagement surface that engages with the engagement portion and a pressing surface that is pressed by the engagement portion, and protrudes in a predetermined direction.

The second member supports the first member such that, at a predetermined position of the first member, the protrusion portion is movable in a direction opposite to the predetermined direction when the pressing surface is pressed, and the protrusion portion is movable in the predetermined direction such that the engagement surface engages with the engagement portion when the press by the engagement portion is released.

Accordingly, by bringing the cover portion close to the base portion such that the engagement portion of the cover portion presses the pressing surface of the protrusion portion, a temporarily-fixed state is obtained automatically. As a result, workability regarding the setting is significantly improved.

The first member may include an engagement release portion capable of pressing the protrusion portion that engages with the engagement portion to move the protrusion portion to a side opposite to the predetermined direction.

By pressing the engagement release portion, the temporarily-fixed state can be easily released.

The dustproof apparatus may further include a fan portion provided at the outlet, a control unit that controls drive of the fan portion, and a sensor unit capable of measuring each of a first temperature of the air in a vicinity of the inlet and a second temperature of the air in a vicinity of the outlet. In this case, the control unit may control the drive of the fan portion on a basis of a difference between the first temperature and the second temperature measured by the sensor unit.

Accordingly, it becomes possible to drive the fan portion in accordance with drive of the image display apparatus, and thus realize saving of power consumption and suppression of noise.

The cover portion may include an openable/closable projection cover portion that covers a projection unit of the image display apparatus.

By opening the projection cover portion, it becomes possible to easily access the projection unit, and cleaning of an inside of the projection cover portion, and the like can be executed with ease.

An image display system according to an embodiment of the present technology includes an image display apparatus and the dustproof apparatus.

An attachment method according to an embodiment of the present technology includes causing a holding portion of a base portion of a dustproof apparatus to hold an image display apparatus.

A connection portion of the base portion is connected to an external attachment portion.

A cover portion of the dustproof apparatus that includes an inlet, a filter portion provided at the inlet, and an outlet that discharges air sucked in from the inlet, is attached to the base portion such that the cover portion covers the image display apparatus held by the holding portion.

Advantageous Effects of Invention

As described above, according to the present technology, high workability can be exerted regarding setting on a ceiling or the like. It should be noted that the effects described herein are not necessarily limited, and any effect described in the present disclosure may be obtained.

MODES FOR CARRYING OUT THE INVENTION

Hereinafter, embodiments of the present technology will be described with reference to the drawings.

[Configuration of Image Display System]

Figure 1:
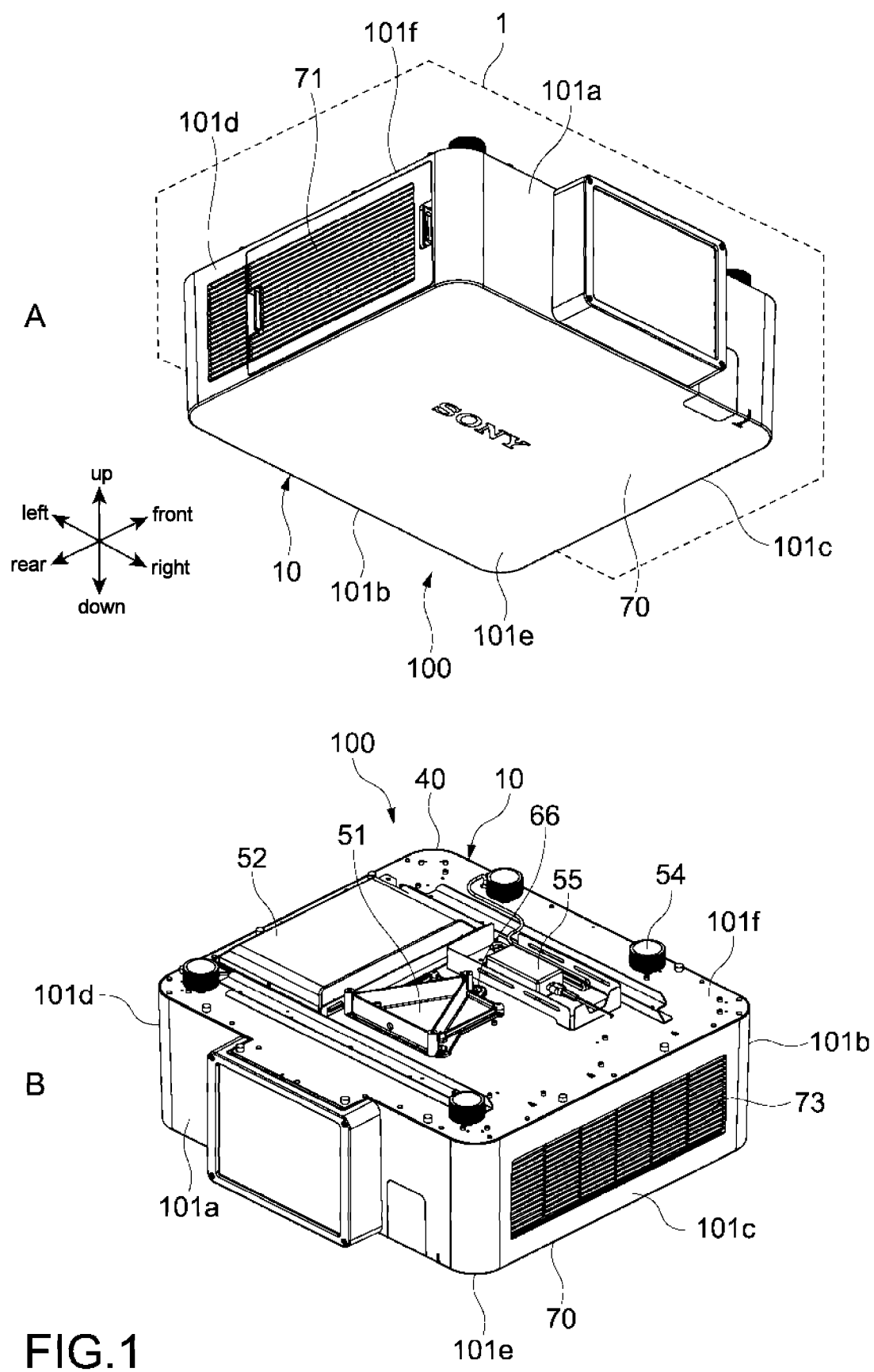
FIGS. 1A and 1B are schematic diagrams showing an appearance example of an image display system according to an embodiment of the present technology.
Figure 2:
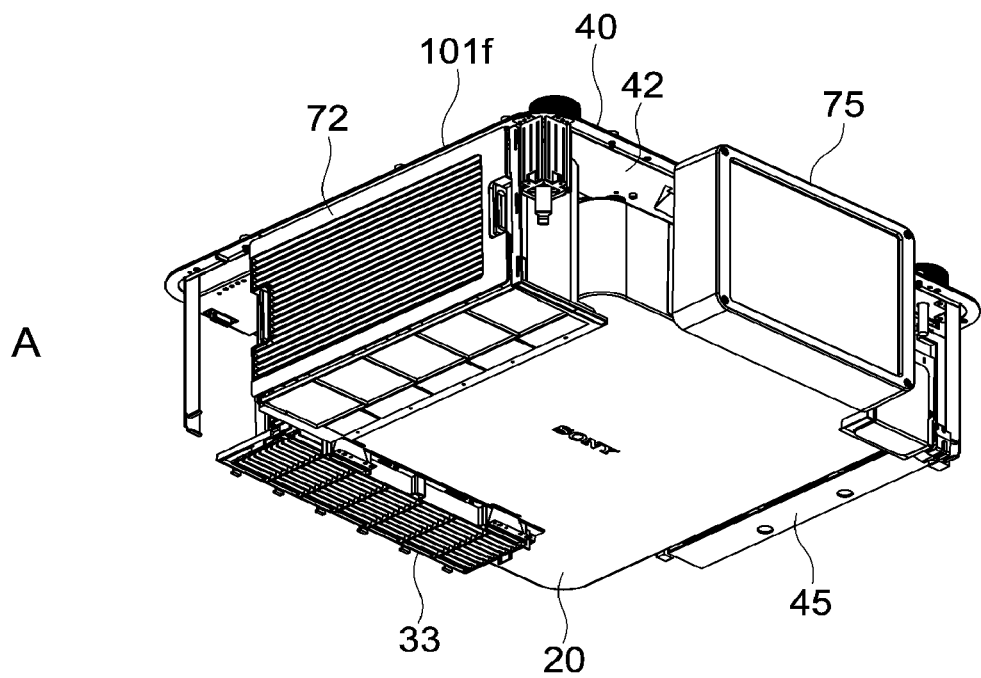
FIGS. 2A and 2B are diagrams in which a part of a top cover of a dustproof apparatus of the image display system is omitted.
Figure 2:
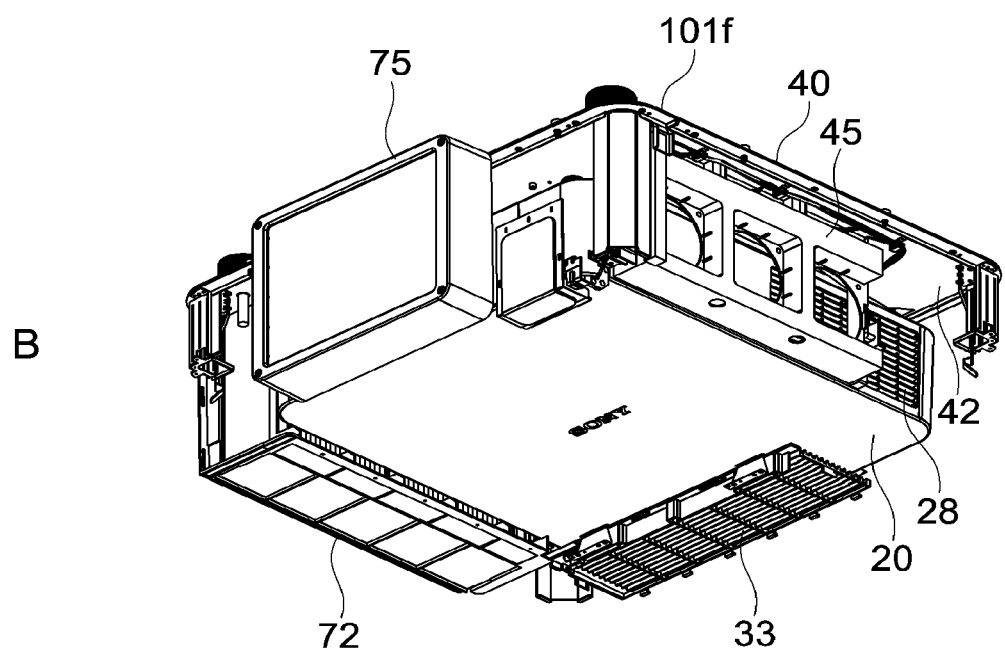

FIGS. 1A and 1B are schematic diagrams showing an appearance example of an image display system according to an embodiment of the present technology. FIGS. 2A and 2B are diagrams in which a part of a top cover of a dustproof apparatus of the image display system is omitted. As shown in FIGS. 1A to 2B, an image display system 100 includes a dustproof apparatus 10 and an image display apparatus 20 accommodated in the dustproof apparatus 10.

As shown in FIG. 1A, the image display system 100 is used while being set on a ceiling 1. Hereinafter, a width direction, a depth direction, and a height direction are determined as viewed from a projection side on which an image is to be projected. As viewed from the projection side, respective surfaces of the image display system 100 are defined as a front surface 101a, a rear surface 101b, a right-hand side surface 101c, a left-hand side surface 101d, a lower surface 101e, and a setting surface 101f. Further, descriptions will be given while referring to sides where these surfaces are respectively located as a front side, a rear side, a right-hand side, a left-hand side, a lower side, and an upper side.

FIG. 1B is a diagram of the image display system 100 as viewed from the setting surface 101f side (upper side). The dustproof apparatus 10 includes a plate-like base portion 40 and a top cover 70 that is to be attached to the base portion 40. By attaching the top cover 70 to the base portion 40, an internal space for accommodating the image display apparatus 20 shown in FIGS. 2A and 2B is formed. The top cover 70 corresponds to a cover portion in this embodiment.

The setting surface 101f becomes a part of the base portion 40, and the front surface 101a, the rear surface 101b, the right-hand side surface 101c, the left-hand side surface 101d, and the lower surface 101e become a part of the top cover 70. As shown in FIGS. 2A and 2B, the image display apparatus 20 is provided on a support surface 42 of the base portion 40 (also see FIG. 4 etc.) on a side opposite to the setting surface 101f. Then, the top cover 70 is attached to the base portion 40 so as to cover the image display apparatus 20.

An inlet 71 is formed on the left-hand side surface 101d of the top cover 70. Further, an outlet 73 for discharging air sucked in from the inlet 71 is formed on the right-hand side surface 101c of the top cover 70. As shown in FIG. 2B, a fan mechanism 45 is provided at the inlet 71. By operating the fan mechanism 45, external air is sucked in from the inlet 71 as cooling air and supplied to the inside of the image display apparatus 20. The air that has cooled the inside of the image display apparatus 20 and has become warm is discharged outside from the outlet 73.

Figure 3:
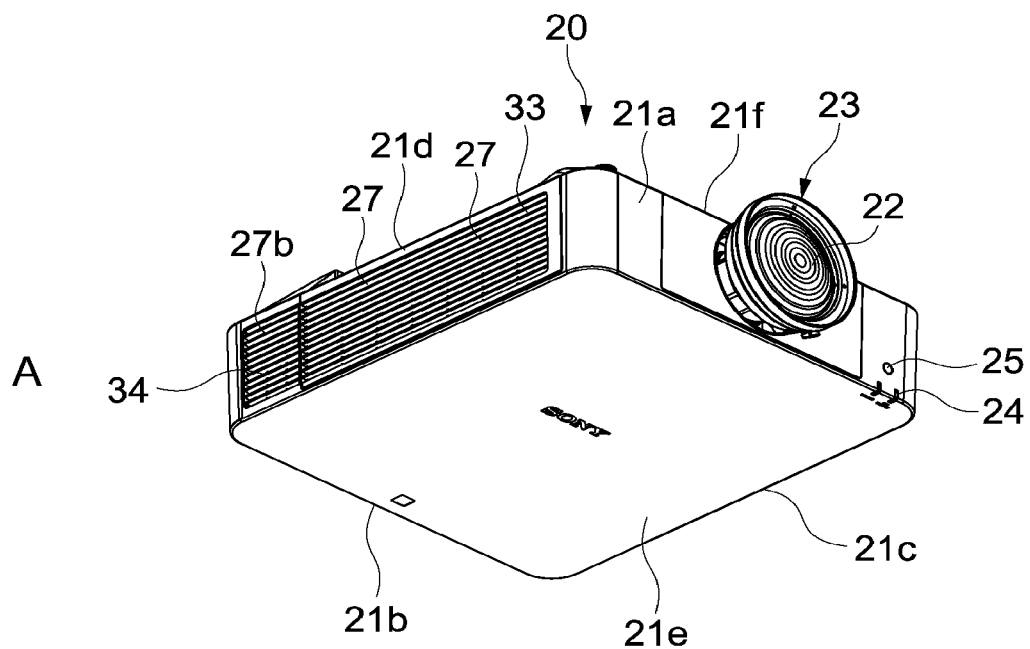
FIGS. 3A and 3B are schematic diagrams showing a configuration example of an image display apparatus.
Figure 3:
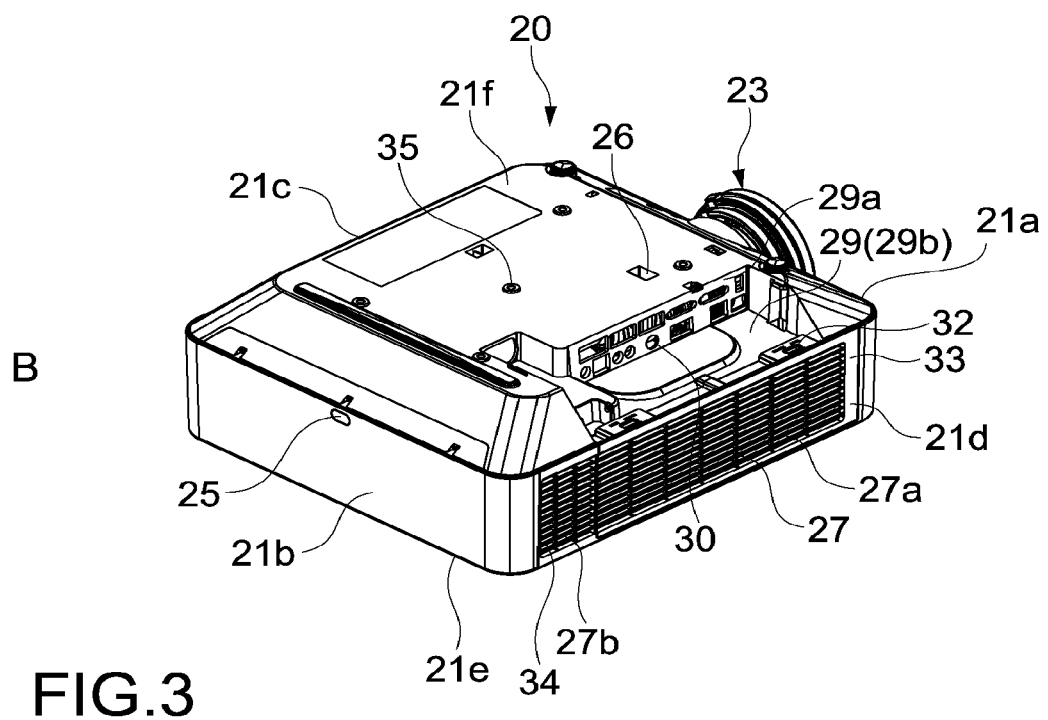

FIGS. 3A and 3B are schematic diagrams showing a configuration example of the image display apparatus 20. The image display apparatus 20 is a projector used presentations, digital cinema, and various other purposes, for example. The present technology is also applicable to other image display apparatuses.

The image display apparatus 20 can be used alone without attaching the dustproof apparatus 10. Further, the image display apparatus 20 is designed to be tilt-free and can be used upside down. For example, in a case where the image display apparatus 20 is set on the ceiling 1, the image display apparatus 20 is used upside down. Also in a case where the image display apparatus 20 is set on the ceiling 1 together with the dustproof apparatus 10 as in this embodiment, the image display apparatus 20 is used upside down.

Respective surfaces of the image display apparatus 20 will be referred to as a front surface 21a, a rear surface 21b, a right-hand side surface 21c, a left-hand side surface 21d, a lower surface 21e, and a setting surface 21f while using a state where the image display apparatus 20 is set on the ceiling 1 as a reference. At a center portion of the front surface 21a, a projection unit 23 including a projection lens 22 for projecting an image is set. Further, an indicator 24 and an IR (infrared) reception unit 25 for remote control are provided on the front surface 21a. It should be noted that the IR reception unit 25 is also set on the rear surface 21b. Further, screw holes 35 for connecting with a connection metal fitting 51 provided on the base portion 40 and an attachment hole 26 for engaging with a guide metal fitting 56 of the base portion 40 are formed substantially at the center of the setting surface 21f.

On the left-hand side surface 21d, an inlet 27 for sucking air into the image display apparatus 20 is provided. On the right-hand side surface 21c, an outlet 28 (see FIG. 2B) for discharging warmed air is provided. A filter is provided in the inlet 27, and a fan mechanism is provided in the outlet 28.

As shown in FIG. 3B, a concave portion 29 is formed from the center of the setting surface 21f to the left-hand side surface 21d, and a plurality of terminals 30 to which a power cable, a DVI terminal cable or an HDMI (registered trademark) terminal cable, and the like are connectable are provided a side surface 29a of the concave portion 29. It should be noted that in the figures, only holes into which terminals are to be inserted are shown, and the holes are denoted as the terminals 30. A rear side (right-hand side surface 21c side) of the side surface 29a of the concave portion 29 and a lower side (lower surface 21e side) of a bottom surface 29b of the concave portion 29 become the internal space of the image display apparatus 20. The bottom surface 29b is connected to an upper portion side of the inlet 27, and air that passes through the inlet 27 passes below the bottom surface 29b and travels inside the image display apparatus 20.

The image display apparatus 20 includes therein, for example, a light source unit including a laser light source and the like, an illumination optical system, light modulation devices such as a liquid crystal panel (both of which are not shown), the projection unit 23, and the like. The light source unit generates white light and emits it to the illumination optical system. The illumination optical system splits the white light into respective color light of RGB and guides the light to the light modulation devices for the respective colors. The light modulation devices modulate the respective color light of RGB on the basis of image information input from outside. Modulated light (image light) of the respective colors is synthesized by a dichroic prism or the like included in the illumination optical system and emitted to the projection unit 23. The projection unit 23 projects the synthesized image light onto a screen or the like via the projection lens 22 and the like. As a result, a color image is generated. Specific configurations of the light source unit, the illumination optical system, and the like are not limited. Further, other configurations for generating an image may also be used.

In this embodiment, the optical system from the light source to the projection lens 22 is accommodated in a predetermined area inside the image display apparatus 20. This area is surrounded by a casing structure (not shown) so that dust or the like does not enter an optical path. On the other hand, a cooling unit such as a heatsink for cooling heat generated by the light source is arranged at a position behind the light source unit in an area spatially separated from that area. In a case where a laser light source is used, high luminance can be realized, but heat processing becomes important. In other words, it is important to efficiently cool the heat of the cooling unit that cools the light source.

As shown in FIGS. 3A and 3B, the inlet 27 includes a first supply port 27a for supplying air to the optical system and a second supply port 27b for supplying air to the cooling unit. Substantially the center portion of the left-hand side surface 21d becomes the first supply port 27a, and a rear side portion becomes the second supply port 27b. It can also be said that the inlet 27 is divided into the first and second supply ports 27a and 27b.

The first supply port 27a communicates with an area accommodating the optical system. When dust or the like enters the optical system, a problem such as lowering of luminance highly likely occurs, so it is necessary to supply clean air to this area. Therefore, a filter (not shown) is provided at the first supply port 27a.

A filter cover 33 that can be detached by operating a lock mechanism 32 is attached to an outer side of the filter. The filter cover 33 is removed when replacing the filter. It should be noted that since the concave portion 29 is covered by an opening cover 52 of the dustproof apparatus 10 to be described later, dust or the like does not enter from the side surface 29a of the concave portion 29 or the like. Cooling air supplied to the optical system is discharged from a discharge-side flow channel hole provided in the vicinity of the fan mechanism and discharged from the outlet 28 as it is.

Meanwhile, air containing dust may be supplied to the cooling unit such as a heatsink. This is because this air does not enter the area accommodating the optical system. Therefore, no filter is provided at the second supply port 27b. Further, no detachable cover is provided, and eave-like vanes 34 are fixed. Since no filter is provided, a flow rate of air that flows in from the second supply port 27b is not restricted. As a result, the cooling air can be supplied at a high flow rate, and the cooling unit can be cooled efficiently. The air supplied from the second supply port 27b is discharged from the outlet 28 by the fan mechanism.

Figure 4:
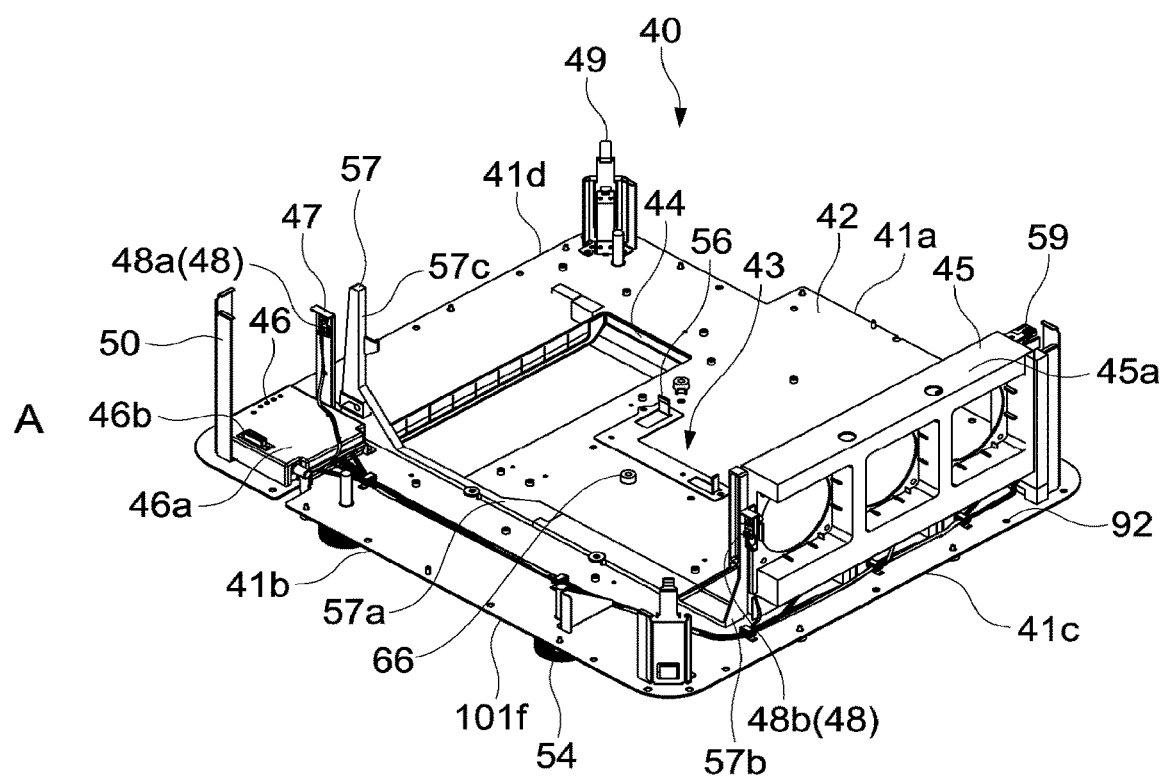
FIGS. 4A and 4B are diagrams respectively showing configuration examples of a base portion and the top cover of the dustproof apparatus.
Figure 4:
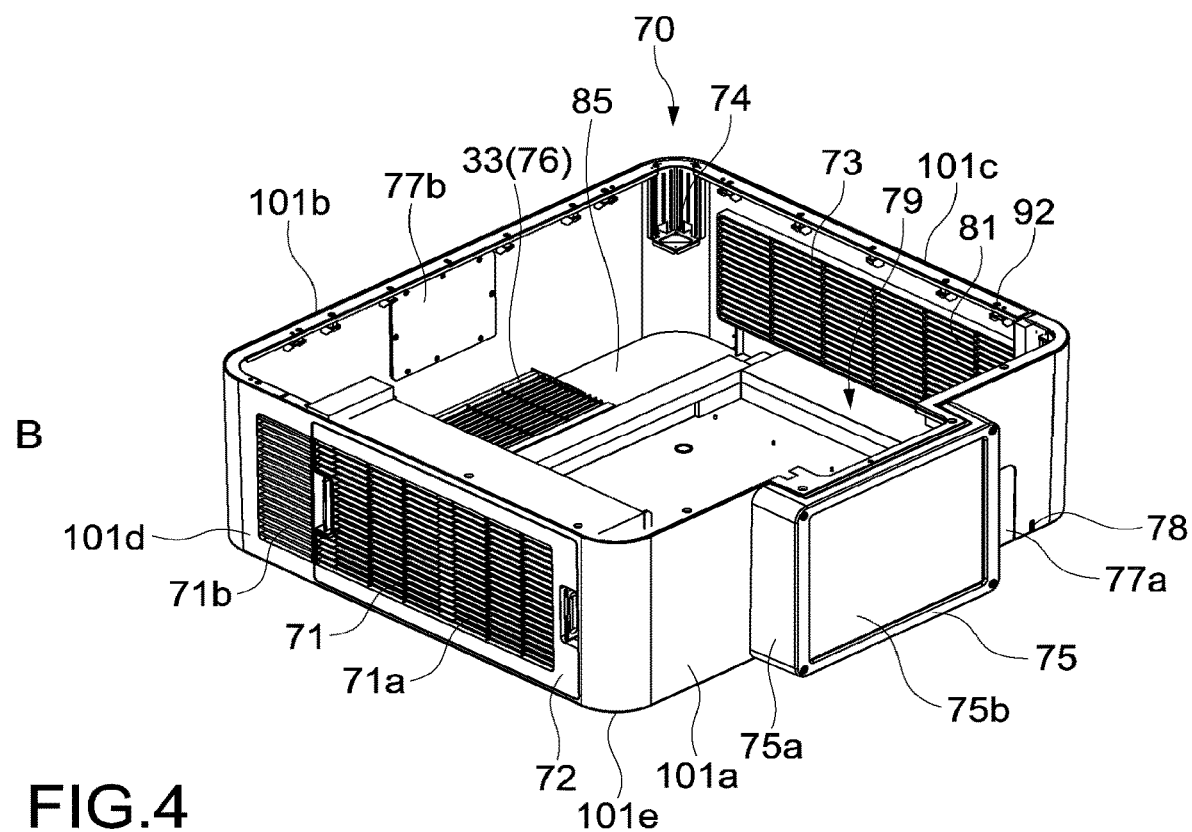

FIG. 4 are diagrams respectively showing configuration examples of the base portion 40 and top cover 70 of the dustproof apparatus 10. The base portion 40 shown in FIG. 4A is illustrated such that the support surface 42 supporting the image display apparatus 20 faces upward.

As shown in FIG. 4A, the base portion 40 has a substantially rectangular shape when viewed from the height direction. The base portion 40 has a size of about 650 mm square, for example, and a metal material such as aluminum, for example, is used as a material thereof. The size and material of the base portion 40 are not limited and may be set as appropriate. 4 side portions surrounding the base portion 40 will be referred to as a front side portion 41a, a rear side portion 41b, a right-hand side portion 41c, and a left-hand side portion 41d in accordance with the names of the respective surfaces of the top cover 70.

On the support surface 42 side of the base portion 40, a holding mechanism (holding portion) 43 that holds the image display apparatus 20, an opening 44, a fan mechanism 45, a control unit 46, a sensor holding portion 47, a sensor unit 48, a temporary-fixing mechanism 49, guide plates 50, and an air separation portion 57 are provided. On the setting surface 101f side shown in FIG. 1B, the connection metal fitting 51 that is to be connected to a ceiling hanger metal fitting 2 (see FIG. 5A), the opening cover 52 that covers the opening 44 from the outer side, a dustproof structure portion 53 (see FIGS. 6A to 6C), support legs 54 that are used when placing the setting surface 101f side on the ground, and an AC adapter 55 are provided.

The holding mechanism 43 includes the connection metal fitting 51 provided on the setting surface 101f side and the guide metal fitting 56 provided at substantially the center of the support surface 42. As shown in FIG. 1B, bosses 66 each having a screw hole formed therein are provided at respective apex positions of a triangle of the connection metal fitting 51. As shown in FIG. 4A, when the connection metal fitting 51 is set, the bosses 66 penetrate and protrude from the support surface 42. By positioning the bosses 66 with the screw holes 35 shown in FIG. 3B and screwing them, the image display apparatus 20 is attached to the base portion 40. By screwing at 3 points positioned at the respective apexes of the triangle, it becomes possible to stably hold the image display apparatus 20. The guide metal fitting 56 is a guide component used when assembling the base portion 40 and the image display apparatus 20.

The air separation portion 57 has a substantially U shape and includes a bottom-surface separation portion 57a provided along the rear side portion 21b and two side-surface separation portions 57b and 57c extending vertically from both ends thereof. In this embodiment, the air separation portion 57 functions as a part of a division portion, but this point will be described later in detail.

The air separation portion 57 is formed of, for example, a general-purpose resin such as an ABS (acrylonitrile butadiene styrene) resin, engineering plastic such as a PC (polycarbonate) resin and a mixed resin of ABS and PC, or the like. Without limiting to these, a metal material such as aluminum may also be used, for example.

Figure 9:
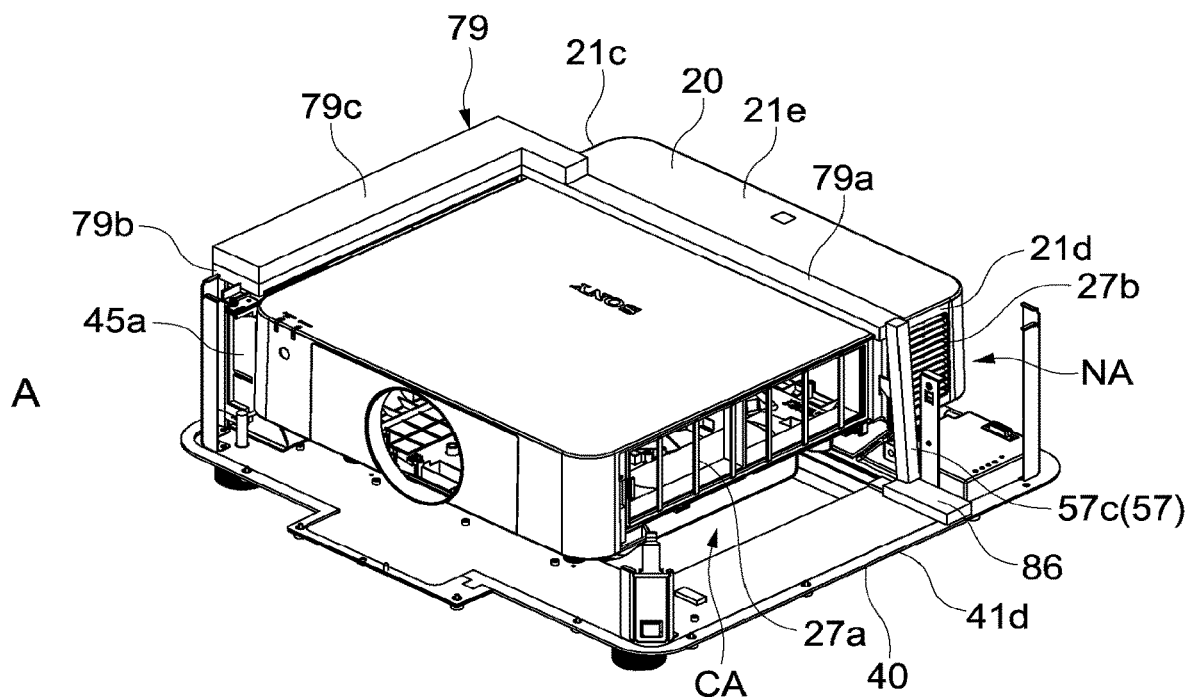
FIGS. 9A and 9B are schematic diagrams showing a configuration example of a divisional cushion portion.
Figure 9:
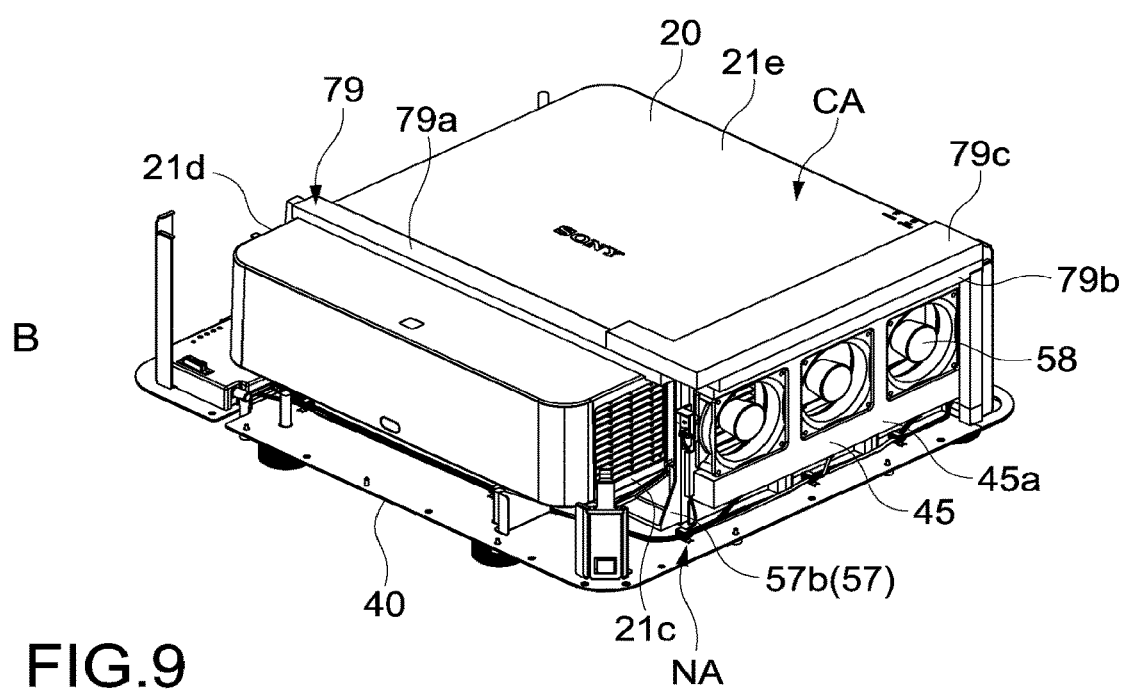

The air separation portion 57 holds a rear-side portion of the image display apparatus 20 (see FIG. 9 etc.). At this time, a gap between the air separation portion 57 and the image display apparatus 20 is hermetically sealed by a cushion member made of sponge, urethane, or the like. An elastic member such as rubber may be used as the sealing member instead of the cushion member. It should be noted that the cushion member may be formed in advance across the entire air separation portion 57. Alternatively, the cushion member may be attached to the held image display apparatus 20 side during assembly.

The fan mechanism 45 is provided along the right-hand side portion 41c and includes a fan holding portion 45a and 3 fans 58 (see FIG. 9B). The fan holding portion 45a is erected vertically from the support surface 42 on the front side of the right-hand side-surface separation portion 57b of the air separation portion 57. The fan holding portion 45a is formed of a resin material (plastic) such as ABS, a metal material, or the like. The fan mechanism 45 corresponds to a fan portion in this embodiment.

Cables that are connected to the respective fans are wired to the control unit 46 from a lower side of the fan holding portion 45a. Further, on the front side of the fan holding portion 45a, an LED 59 serving as an indicator that indicates a driving state of the fans 58 is provided. A cable is also wired from the LED 59 toward the control unit 46.

The control unit 46 is formed at a corner between the rear side portion 41b and the left-hand side portion 42d. The control unit 46 is arranged in a space on the rear side of the left-hand side-surface separation portion 57c of the air separation portion 57. The control unit 46 includes a cover 46a and a substrate (not shown) accommodated in the cover. A control circuit or the like that controls a power supply circuit, the fans 58, the LED 59, and the like is formed on the substrate.

These circuits are realized by, for example, a microcomputer in which a predetermined IC (integrated circuit), a CPU, memories (RAM, ROM), I/O, and the like are mounted on one chip. Further, PLD (Programmable Logic Device) such as FPGA (Field Programmable Gate Array) or other devices such as ASIC (Application Specific Integrated Circuit) may also be used.

The AC adapter 55 shown in FIG. 1B, that is provided on the setting surface 101f, is connected to the control unit 46. An outlet cable (not shown) is connected to the AC adapter 55 and is also connected to an outlet set on the ceiling 1 or the like. The control unit 46 receives electric power via the AC adapter 55 and executes various operations.

The sensor unit 48 includes a first temperature sensor 48a provided in the vicinity of the left-hand side portion 41d and a second temperature sensor 48b provided in the vicinity of the right-hand side portion 41c. As each of the temperature sensors, an arbitrary temperature sensor including well-known temperature sensors may be used. Further, the same temperature sensor may be used as the first and second temperature sensors 48a and 48b, or different types of temperature sensors may be used.

As shown in FIG. 4A, on the rear side of the left-hand side portion 41d, a plate-like sensor holding portion 47 is provided adjacent to the control unit 46. The first temperature sensor 48a is provided at a tip end of the sensor holding portion 47 that is erected vertically. Meanwhile, the second temperature sensor 48b is provided on the fan holding portion 45a on the rear side of the right-hand side portion 41c. When viewed from the support surface 42, the first and second temperature sensors 48a and 48b are set at heights substantially equal to each other. Of course, the present technology is not limited to this, and the setting positions may be varied depending on temperature sensitivities. Cables are wired from the respective temperature sensors 48a and 48b toward the control unit 46.

The first temperature sensor 48a measures a first temperature near the inlet 71 of the top cover 70. The second temperature sensor 48b measures a second temperature near the outlet 73 of the top cover 70. The control unit 46 controls drive of the fans 58 on the basis of a difference between the first and second temperatures. Specifically, in a case where the difference between the first and second temperatures is larger than a predetermined threshold value, it is judged that the image display apparatus 20 is being driven, and the drive of the fans 58 is started.

Since the fans 58 can be driven in accordance with the drive of the image display apparatus 20, it becomes possible to prevent the fans 58 from being driven wastefully at unnecessary times. As a result, power consumption can be saved, and generation of noise can be prevented.

Further, by configuring the sensor unit 48, the driving state of the image display apparatus 20 can be judged even when the control unit 46 and the image display apparatus 20 are not electrically connected. As a result, it becomes possible to omit a mechanism for connecting the control unit 46 and the image display apparatus 20, and the like, and thus suppress costs. Furthermore, a connection task can be omitted, and workability regarding attachment of the dustproof apparatus 10 can be improved. It should be noted that it is also possible to provide only one temperature sensor and drive the fans 58 in a case where the measured temperature exceeds a predetermined threshold value.

As shown in FIG. 4A, a connector 46b such as a DVI terminal may be provided in the control unit 46 so as to enable the control unit 46 and the image display apparatus 20 to be electrically connected. In this case, the driving state of the image display apparatus 20 can be detected directly, and thus a driving timing of the fans 58 can be detected accurately.

The guide plates 50 are respectively provided at a corner between the rear side portion 41b and the left-hand side portion 41d and a corner between the front side portion 41a and the right-hand side portion 41c, which is a diagonally-opposite position. The guide plates 50 are each a rectangular plate member and extend vertically from the support surface 42. When attaching the top cover 70 to the base portion 40, a mutual positional relationship is guided by the guide plates 50. Moreover, a strength of the top cover 70 is also reinforced.

Figure 5:
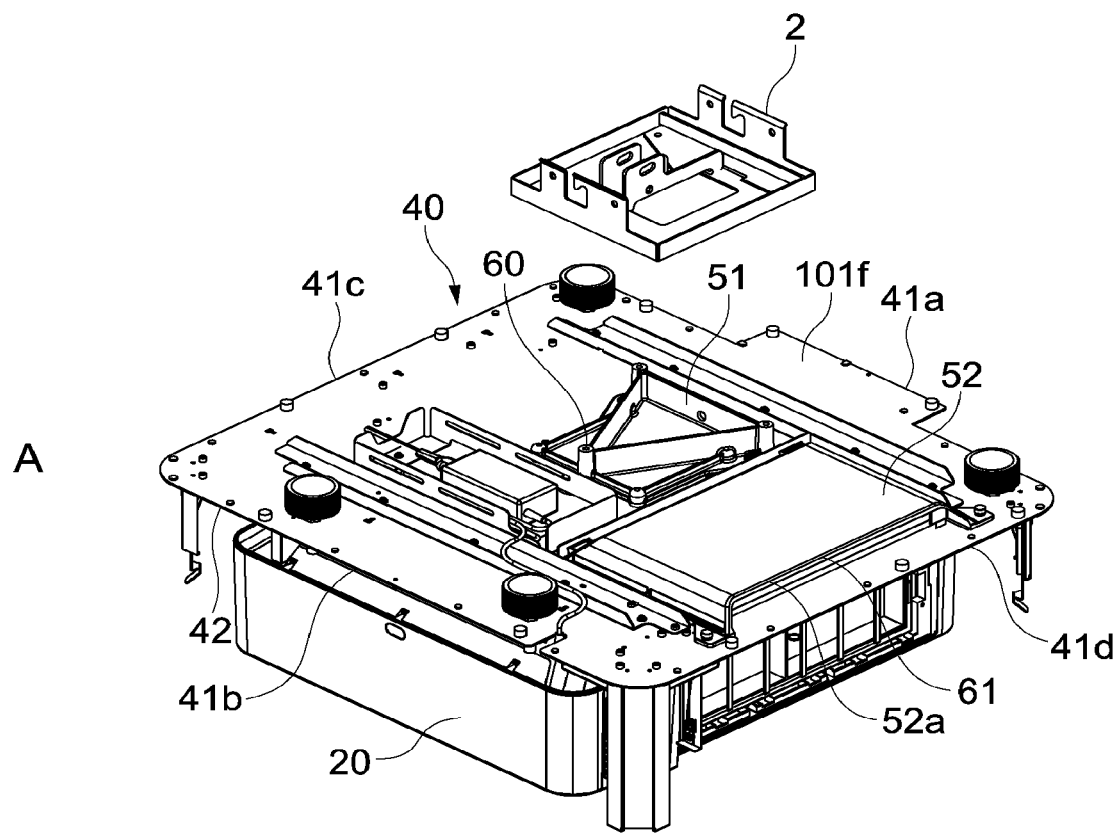
FIGS. 5A and 5B are diagrams showing a state where a setting surface side faces upward while the image display apparatus is held.
Figure 5:
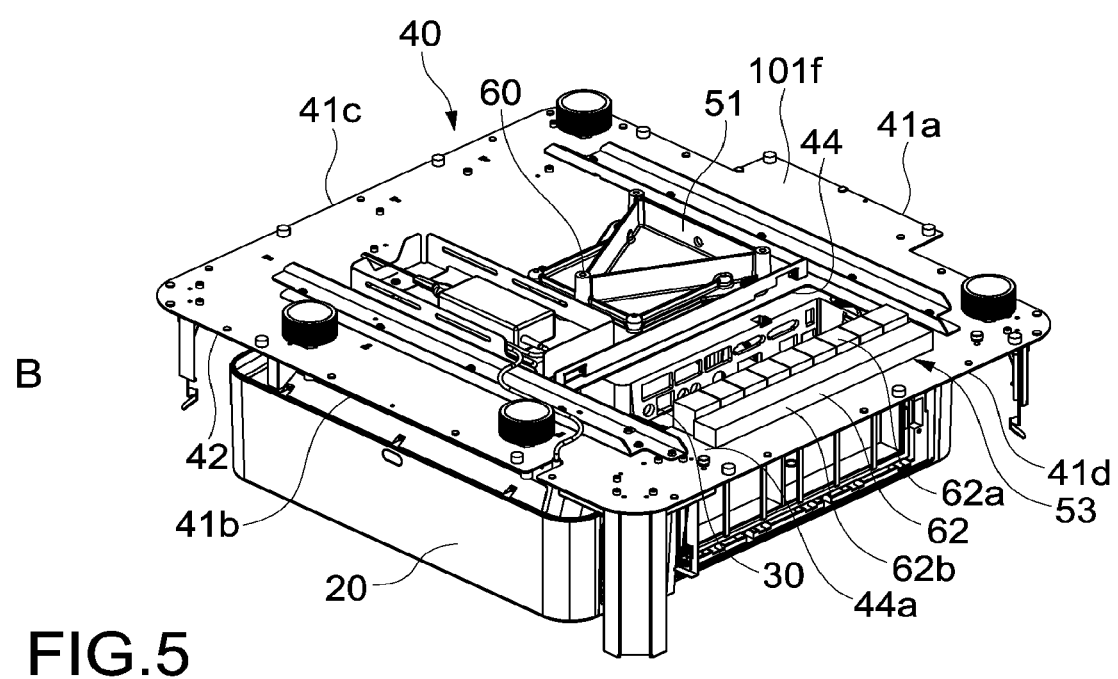

The setting surface 101f side of the base portion 40 will be described. FIGS. 5A and 5B are explanatory diagrams therefor and show a state where the setting surface 101f side faces upward while the image display apparatus 20 is held on the support surface 42.

As shown in FIG. 5A, the ceiling hanger metal fitting 2 is connected to the connection metal fitting 51. In this embodiment, the screw holes 60 are formed in the connection metal fitting 51 at positions of the respective apexes of the triangle (in vicinity of bosses 66) and screwed at that position, to thus connect the connection metal fitting 51 and the ceiling hanger metal fitting 2. By being screwed at the 3 points, these can be connected stably. After the ceiling hanger metal fitting 2 is screwed, the ceiling hanger metal fitting 2 is attached to a main body portion of the ceiling hanger metal fitting attached to the ceiling 1. As a result, the base portion 40 holding the image display apparatus 20 is set on the ceiling 1.

In this embodiment, the connection metal fitting 51 functions as a holding portion and a connection portion. Further, the ceiling hanger metal fitting 2 (including main body portion) corresponds to an external attachment portion. The configurations of the connection metal fitting 51, the ceiling hanger metal fitting 2, the main body of the ceiling hanger metal fitting, and the like, the method of connecting these, and the like are not limited.

As shown in FIG. 5B, the opening 44 is formed between the left-hand side portion 41d and the connection metal fitting 51. The opening 44 is formed for drawing out a power cable and the like to be connected to the image display apparatus 20 to the outside. As shown in FIG. 5B, in a case where the image display apparatus 20 is set on the support surface 42 of the base portion 40, the terminals 30 to which the power cable and the like are to be connected can be seen from the setting surface 101f side via the opening 44. The position, shape, and the like of the opening 44 are designed as appropriate in accordance with the position of the terminals 30 of the image display apparatus 20.

As shown in FIG. 5A, the opening cover 52 covers the opening 44 from the outer side. A left-hand side portion 52a of the opening cover 52 extends along the left-hand side portion 41d and protrudes upward so that a gap is formed between it and the setting surface 101f. This space between the setting surface 101f and the opening cover 52 becomes a drawing port 61 for drawing out the power cable and the like. Specifically, the drawing port 61 is formed between a partial circumferential portion 44a on the left-hand side of the opening 44 and an opposing portion 52b opposing the circumferential portion 44a on an inner side of the left-hand side portion 52a of the opening cover 52. The shape of the drawing port 61 as viewed from the left-hand side portion 41d side is a rectangular shape.

External dust and the like are required to be prevented from entering while drawing out one or more cables from the drawing port 61. To attain this object, the dustproof structure portion 53 is provided in the drawing port 61.

Figure 6:
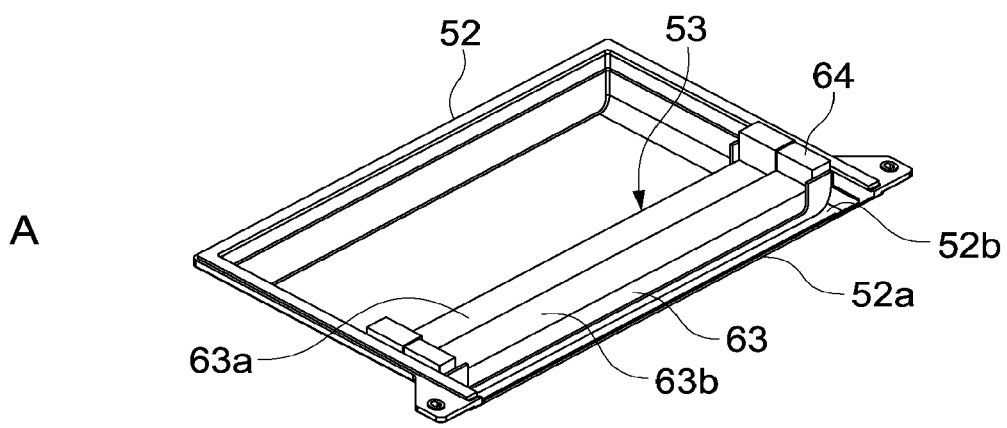
FIGS. 6A to 6C are schematic diagrams showing a configuration example of a dustproof structure portion provided at an outlet.
Figure 6:
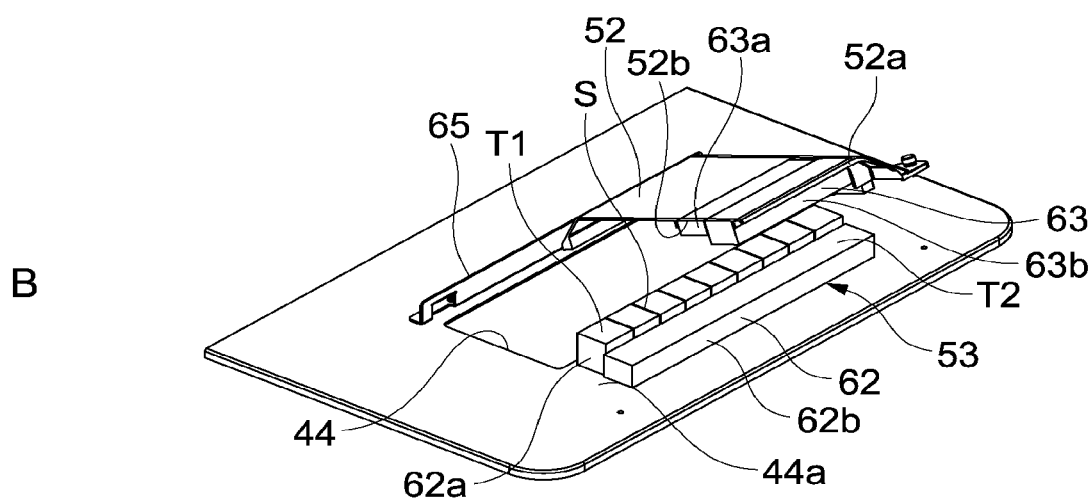
Figure 6:
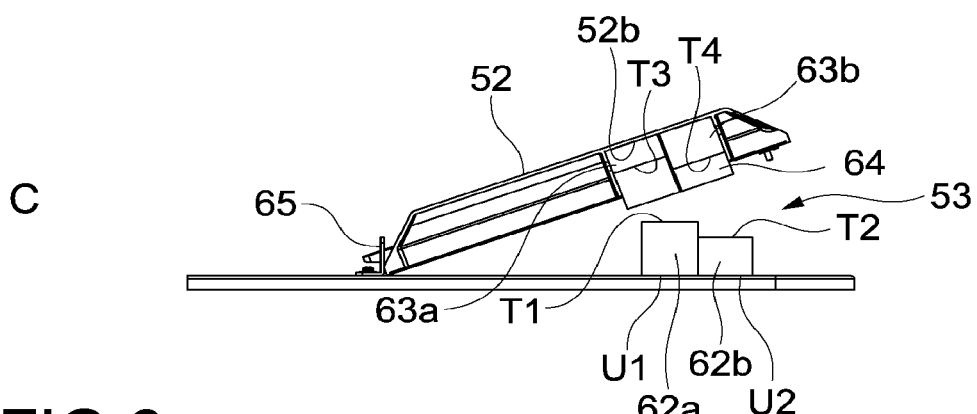

FIGS. 6A to 6C are schematic diagrams showing a configuration example of the dustproof structure portion 53 provided in the drawing port 61. The dustproof structure portion 53 includes a holding-side cushion member 62 provided at the circumferential portion 44a of the opening 44 and an adhesion-side cushion member 63 provided at the opposing portion 52b of the opening cover 52.

As shown in FIG. 6B, the holding-side cushion member 62 includes a first holding-side cushion 62a having a substantially cuboid shape and a second holding-side cushion 62b that also has a substantially cuboid shape and has a size in a longitudinal direction substantially equal to that of the first holding-side cushion 62a.

The first holding-side cushion 62a is provided adjacent to the opening 44, and assuming that a surface that is in contact with the setting surface 101f is a lower surface U1 and the opposite side is an upper surface T1, a plurality of slits S are formed from the upper surface T1 to the lower surface U1. The plurality of slits S are aligned in the longitudinal direction of the first holding-side cushion 62a and formed to extend in a short-side direction. The short-side direction that is the extension direction of the slits S is made to coincide with a direction that is directed from the drawing port 61 to the outside.

The second holding-side cushion 62b is provided adjacently along an outer-side side surface of the first holding-side cushion 62a. It is assumed that a surface of the second holding-side cushion 62b that is in contact with the setting surface 101f is a lower surface U2, and the opposite side is an upper surface T2. Then, as shown in FIG. 6C, a height of the upper surface T2 of the second holding-side cushion 62b is set to be lower than that of the upper surface T1 of the first holding-side cushion 62a while using the setting surface 101f as a reference. Further, the height of the upper surface U2 of the second holding-side cushion 62b is set to be higher than that of a lower end of the plurality of slits S formed in the first holding-side cushion 62a.

For example, it is assumed that the height of the upper surface T1 of the first holding-side cushion 62a is L mm, and a depth of the slits (depth of slits from upper surface T1 toward lower surface U1) is M mm. As a result, the height of the lower end of the slits S becomes L mm−M mm. In this case, a height N mm of the upper surface T2 of the second holding-side cushion 62b is set to be L mm−M mm<N mm<L mm. It should be noted that typically, L mm>N mm, for example, N mm=⅔ L mm is set, though of course is not limited thereto.

As shown in FIG. 6A, the adhesion-side cushion member 63 includes a first adhesion-side cushion 63a that has a substantially cuboid shape and adheres tightly to the upper surface T1 of the first holding-side cushion 62a when the opening cover 52 is attached, and a second adhesion-side cushion 63b that has a substantially cuboid shape and adheres tightly to the upper surface T2 of the second holding-side cushion 62b. In addition, the adhesion-side cushion member 63 includes side adhesion cushions 64 formed at both end portions of the first and second adhesion-side cushions 63a and 63b. When the opening cover 52 is attached, the side adhesion cushions 64 adhere tightly to both end portions of the first and second holding-side cushions 62a and 62b from the sides and hermetically seal both end portions of the drawing port 61.

As shown in FIG. 6C, assuming that a surface that comes into contact with the opposing portion 52b of the opening cover 52 is a lower surface and a surface on the other side is an upper surface, an upper surface T3 of the first adhesion-side cushion 63a adheres tightly to the upper surface T1 of the first holding-side cushion 62a. Further, an upper surface T4 of the second adhesion-side cushion 63b adheres tightly to the upper surface T2 of the second holding-side cushion 62b. A height of the upper surface T3 of the first adhesion-side cushion 63a is set to be lower than that of the upper surface T4 of the second adhesion-side cushion 63b.

Such a difference in heights is set in accordance with a difference of heights between the upper surfaces T1 and T2 of the first and second holding-side cushions 62a and 62b. For example, the heights are set such that, when the opening cover 52 is attached, the upper surfaces T3 and T4 of the first and second adhesion-side cushions 63a and 63b are capable of pressing the upper surfaces T1 and T2 of the first and second holding-side cushions 62a and 62b.

The plurality of cables connected to the terminals 30 of the image display apparatus 20 via the opening 44 are inserted into the slits S of the first holding-side cushion 62a and nipped by the slits S. The cables are inserted down to the vicinity of the lower end of the slits S, but are slightly bent upward and held on the upper surface T2 portion of the second holding-side cushion 62b.

As shown in FIGS. 6B and 6C, the opening cover 52 is attached so as to cover the opening 44 with an engagement portion 65 at the other circumferential portion of the opening 44 being an axis. The upper surfaces T1 and T2 of the first and second holding-side cushions 62a and 62b are adhered sufficiently tightly to the upper surfaces T3 and T4 of the first and second adhesion-side cushions 63a and 63b. As a result, it becomes possible to sufficiently prevent external dust and the like from entering via the drawing port 61, and exert a high dustproof effect.

The first and second holding-side cushions 62a and 62b, the first and second adhesion-side cushions 63a and 63b, and the side adhesion cushions 64 are formed of, for example, sponge, urethane, or the like. Other sealing members such as rubber may also be used. In this embodiment, a cushion member having high hardness is used for the first holding-side cushion 62a on which the slits S are formed. As a result, the cables can be sufficiently inserted into and held by the slits S. For other members, cushion members having relatively low hardness are used. As a result, appropriate deformations become possible, and a sufficient sealing effect can be exerted.

As shown in FIG. 4A, the temporary-fixing mechanisms 49 are respectively provided at a corner between the front side portion 41a and the left-hand side portion 41d and a corner between the rear side portion 41b and the right-hand side portion 41c, which is a diagonally-opposite position. The temporary-fixing mechanisms 49 function when attaching the top cover 70 to the base portion 40 set on the ceiling 1 in a state where the image display apparatus 20 is held. In other words, the temporary-fixing mechanisms 49 temporarily fix the top cover 70 so as to prevent it from falling during attachment. Details of the temporary-fixing mechanisms will be described later.

Figure 7:
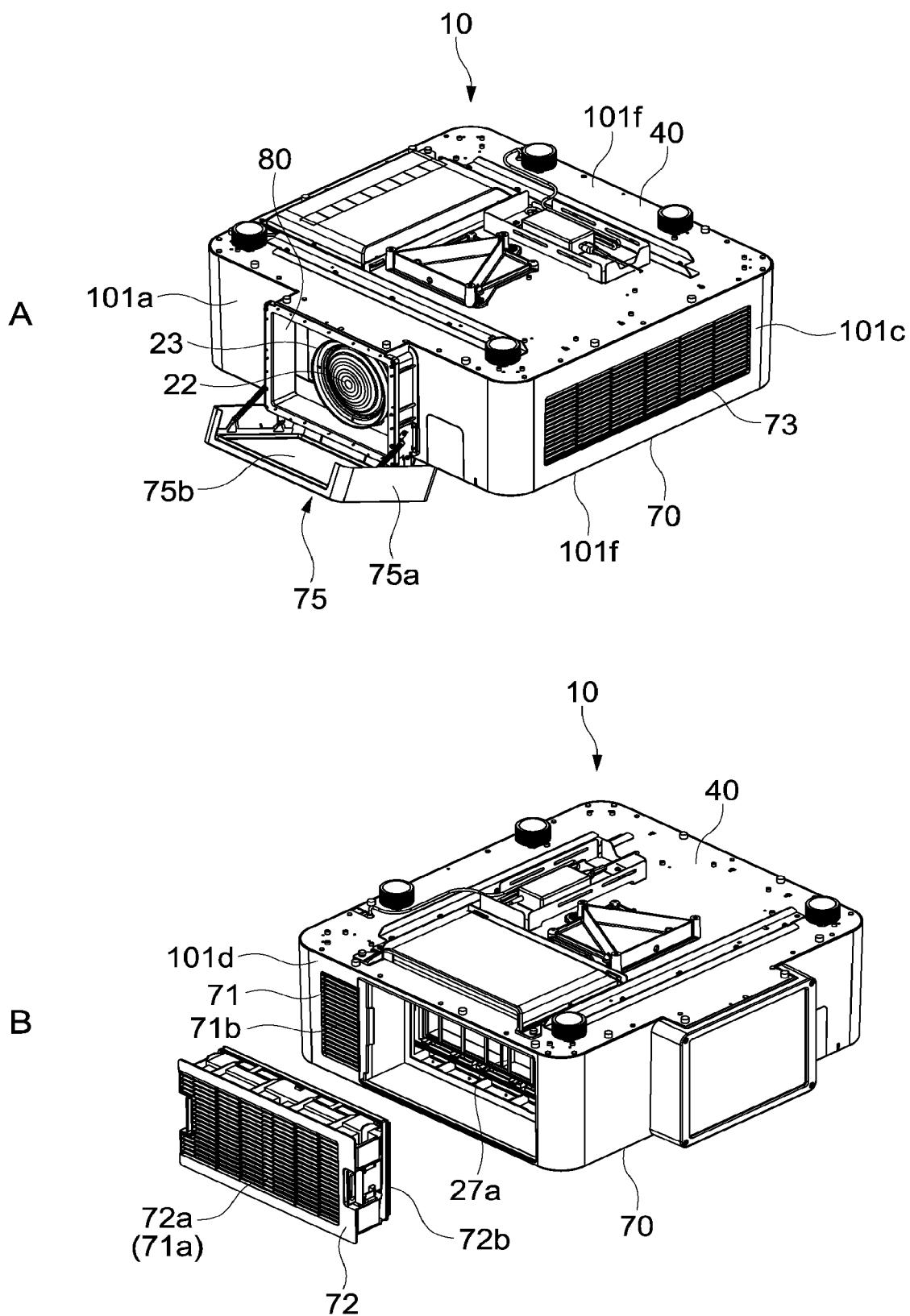
FIGS. 7A and 7B are schematic diagrams showing a configuration example of the top cover.
Figure 8:
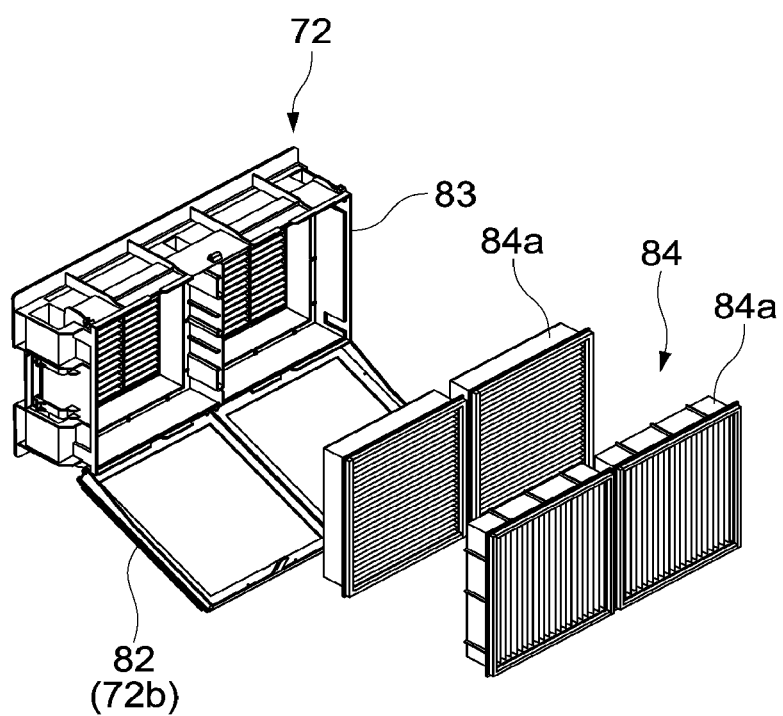
FIG. 8 is a schematic diagram showing a configuration example of a filter block.

With reference to FIGS. 4B, 7, and 8, the top cover 70 will be described. The top cover 70 includes the inlet 71, a filter block 72, the outlet 73, engagement portions 74, a front cover 75, a filter cover holding portion 76, transparent windows 77a and 77b, an indicator window 78, and a divisional cushion portion 79.

The top cover 70 is formed of, for example, a general-purpose resin such as an ABS resin, engineering plastic such as a PC resin and a mixed resin of ABS and PC, or the like. By using the resin material, the weight of the top cover 70 can be reduced. Of course, other materials may also be used.

The front cover 75 is provided at a center portion of the front surface portion 101a so as to cover the projection lens 22 (projection unit 23) of the image display apparatus 20. The front cover 75 includes a frame portion 75a and a translucent cover 75b formed of glass or the like, for example, for hermetically sealing an opening portion formed by the frame portion 75a. Image light projected from the projection lens 22 is projected onto a screen or the like via the translucent cover 75b. The front cover 75 corresponds to a projection cover portion in this embodiment.

As shown in FIG. 7A, the front cover 75 is provided so as to be openable/closable with respect to the front surface 101a. An opening 80 is formed at a central portion of the front surface 101a, and the front cover 75 is configured to hermetically seal the opening 80. In the opened state shown in FIG. 7A, it is possible to access the projection unit 23 from outside via the opening 80. Accordingly, it becomes possible to easily perform a manual focus adjustment, replacement of the projection lens 22, and the like, for example, without removing the dustproof apparatus 10.

In the closed state shown in FIG. 4B or the like, the opening 80 is sufficiently hermetically sealed by the front cover 75 so that external dust or the like does not enter from the opening 80. For this purpose, for example, cushion members, sealing members, and the like may be provided in a periphery of the opening 80, a periphery of the translucent cover 75b, and the like.

Regarding the front cover 75 exemplified in FIG. 7A, the front cover 75 is opened from the setting surface 101f toward the lower surface 101e. In other words, the opened and closed states of the front cover 75 are mutually switched using a height direction thereof as an opening/closing direction. As a result, the projection unit 23 can be easily accessed from both the right- and left-hand sides. Of course, it is also possible to access from the lower surface 101e side and the setting surface 101f side.

Alternatively, opening and closing of the front cover 75 may be performed in either the right- or left-hand direction while using either the right- or left-hand direction of the opening 80 as an axis. In other words, the opening/closing direction of the front cover 75 is not limited and may be set as appropriate. In addition, the structure for opening and closing the front cover 75 may also be designed arbitrarily.

The outlet 73 is formed across substantially an entire area of the right-hand side surface 101c. The outlet 73 is provided so as to face the fan mechanism 45 provided on the base portion 40. The outlet 73 is provided in the same direction as the outlet 28 of the image display apparatus 20 held by the base portion 40, that is, on the right-hand side. Air discharged from the outlet 28 of the image display apparatus 20 is discharged from the outlet 73 of the top cover 70 to the outside. As shown in FIG. 4B, eave-shaped vanes 81 are attached to the outlet 73.

The inlet 71 is formed across substantially an entire area of the left-hand side surface 101d. As shown in FIG. 7B, the filter block 72 is detachably attached to the left-hand side surface 101d. When the filter block 72 is attached to the left-hand side surface 101d, a suction port 72a of the filter block 72 becomes a part of the inlet 71. In this embodiment, a portion of the suction port 72a of the filter block 72 becomes a first suction area 71a of the inlet 71. Meanwhile, a portion fixedly formed on a rear side of the left-hand side surface 101d becomes a second suction area 71b of the inlet 71.

When the filter block 72 is attached, the first suction area 71a and the first supply port 27a shown in FIGS. 3A and 3B oppose each other, and a discharge port 72b of the filter block 72 come into communication with the first supply port 27a. The air sucked in from the first suction area 71a is supplied to the optical system including the light source via the first supply port 27a.

As shown in FIG. 8, the filter block 72 includes a casing portion 83 including an openable/closable lid portion 82, and a filter portion 84 accommodated inside the casing portion 83. The lid portion 82 side becomes the discharge port 72b of the filter block 72. In this embodiment, two filters 84a each including two filter portions formed of folded filter paper are laminated and accommodated in the casing portion 84. As a result, clean air from which dust or the like has been sufficiently removed can be supplied to the optical system. It should be noted that the configuration of the filter portion 84 is not limited, and a sponge type or a charge type may be used.

The second suction area 71b opposes the second supply port 72b shown in FIGS. 3A and 3B. Since no filter is provided in the second suction area 71b, a flow rate of air that flows in from the second suction area 71b is not restricted. Therefore, it becomes possible to swiftly supply cooling air to the cooling unit such as a heatsink via the second suction area 71b and the second supply port 27b. As a result, the cooling unit can be cooled efficiently.

The filter cover holding portion 76 is provided on a rear side of an inner surface 85 opposite to the lower surface 101e. The filter cover holding portion 76 holds the filter cover 33 that covers the first supply port 27a of the image display apparatus 20 held on the support surface 42 of the base portion 40. As a result, there is no need to prepare a place or the like to put the removed filter cover 33, and it becomes possible to improve workability regarding setting of the image generation system 100. Further, the removed filter cover 33 can be prevented from becoming lost and the like. A specific configuration of the filter cover holding portion 76 is not limited.

The transparent windows 77a and 77b are provided on the front surface 101a and the rear surface 101b, respectively. The indicator 24 of the image display apparatus 20 can be checked via the transparent window 77a on the front surface 101a. Further, control signals can be transmitted to the IR reception unit 25 for remote control via the transparent window 77a. The transparent window 77b on the rear surface 101b is provided for enabling control signals to be transmitted to the IR reception unit 25 provided on the rear surface 21b of the image display apparatus 20.

The indicator window 78 is formed at a position where the LED 59 that indicates the driving state of the fans 58 shown in FIG. 4A can be checked. For example, the LED 59 is lit in red when the fans 58 are in a standby state and blinks in red when the fans 58 break down. In a case where the fans 58 are normally driven, the LED 59 is lit in green. By the LED 59 as the indicator, the driving state of the fans 58 can be checked easily.

The engagement portions 74 are portions that engage with the temporary-fixing mechanisms 49 provided on the base portion 40. The engagement portions 74 at respectively provided at a corner between the front surface 101a and the left-hand side surface 101d in the top cover 70 and a corner between the rear surface 101b and the right-hand side surface 101c, which is a diagonally-opposite position. Details of the engagement portions 74 will be described later.

Figure 10:
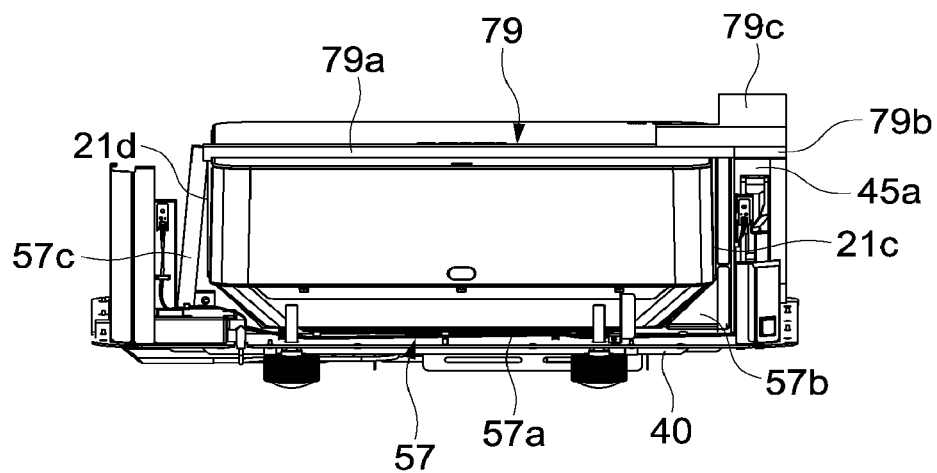
FIG. 10 is a schematic diagram showing a configuration example of the divisional cushion portion.
Figure 11:
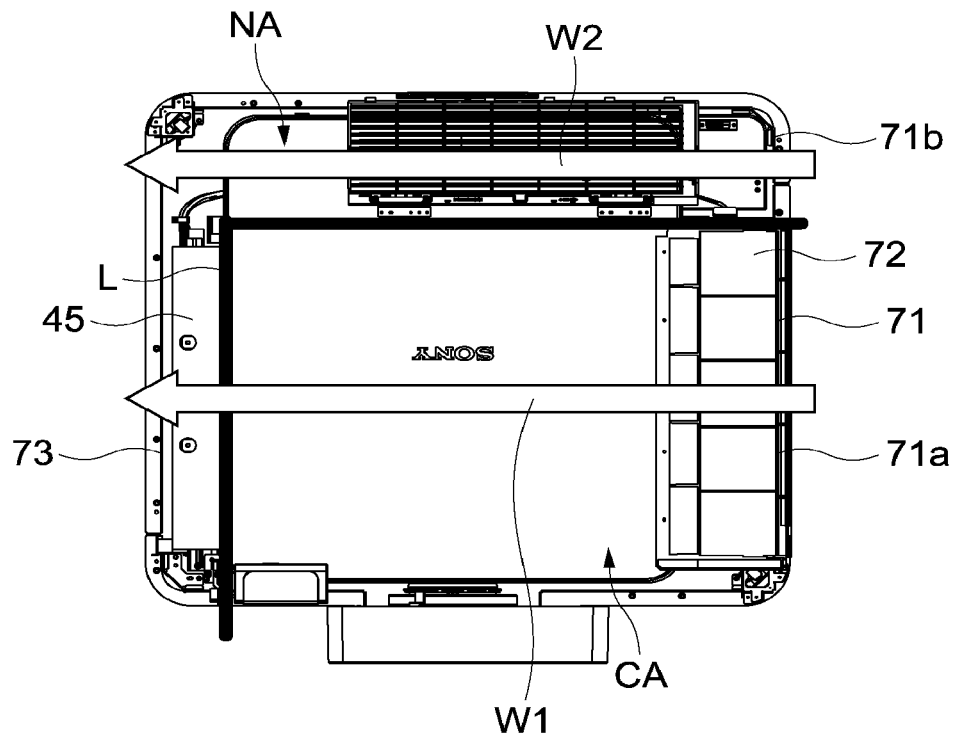
FIG. 11 is a schematic diagram showing an example of positions of a clean air area and a normal air area.

FIGS. 9 to 11 are diagrams for explaining the divisional cushion portion 79. As shown in FIG. 4B, the divisional cushion portion 79 is provided on the inner surface 85 of the top cover 70. When the top cover 70 is attached so as to cover the image display apparatus 20 held by the base portion 40, the divisional cushion portion 79 adheres tightly to the lower surface 21e of the image display apparatus 20 and the fan holding portion 45a as shown in FIGS. 9 and 10.

As shown in FIGS. 9 and 10, the divisional cushion portion 79 includes first to third cushion members 79a to 79c. The first cushion member 79a adheres tightly to the rear side of the lower surface 21e of the image display apparatus 20 fully across from the left-hand side surface 21d to the right-hand side surface 21c.

The second cushion member 79b adheres tightly to an entire upper surface (lower side at time of setting) of the fan holding portion 45a. The third cushion member 79c has a substantially L shape and is superimposed on an entire area on the second cushion member 79b and a left-end area of the first cushion member 79a. The area of the first cushion member 79a excluding the left-end area and the entire area of the third cushion member 79c are portions that come into contact with the inner surface 85 of the top cover 70.

Similar to the air separation portion 57 described above, the divisional cushion portion 79 functions as a part of the division portion in this embodiment. As shown in FIG. 11, the division portion includes a function of dividing the internal space into a clean air area CA as a first area and a normal air area NA as a second area. In FIG. 11, a boundary between both areas is represented by an L-shaped line L1. An area surrounded by the line L including a large portion of the image display apparatus 20 becomes the clean air area CA. An area outside the line L becomes the normal air area NA. It should be noted that the clean air area CA and the normal air area NA are spatially separated by holding the image display apparatus 20 on the base portion 40 and attaching the top cover 70.

As shown in FIGS. 9 and 10, the rear-side portion of the image display apparatus 20 is provided in the air separation portion 57. As shown in FIG. 9A, in the image display apparatus 20, the left-hand side-surface separation portion 57c of the air separation portion 57 is positioned at the boundary between the first and second supply ports 27a and 27b. As shown in FIG. 10, when viewed from the rear, the image display apparatus 20 and the air separation portion 57 adhere tightly to each other without a gap by the cushion members provided therebetween.

The front side of the side-surface separation portion 57c shown in FIG. 9A becomes the clean air area CA, and the rear side thereof becomes the normal air area NA. In other words, the division portion divides the internal space into the two areas such that the first supply port 27a is included in the clean air area CA and the second supply port 72b is included in the normal air area NA.

It should be noted that since the filter block 72 is arranged in the vicinity of the left-hand side portion 41d on the front side of the side-surface separation portion 57c and in the space between the side-surface separation portion 57c and the left-hand side portion 41d, the clean air area CA and the normal air area NA are separated appropriately. It should be noted that a cushion member 86 for the division into both areas is provided from a root portion of the side-surface separation portion 57c to the left-hand side portion 41d.

An area on the front side of the right-hand side-surface separation portion 57b shown in FIG. 9B and on an inner side of the fan mechanism 45 becomes the clean air area CA. An area on the rear side of the side-surface separation portion 57b between the fan mechanism 45 and the outlet 73 becomes the normal air area NA. Since the fans 58 operate, dust or the like does not flow backward.

As shown in FIG. 10, when the top cover 70 is attached, the periphery of the image display apparatus 20 is surrounded by the left- and right-hand side-surface separation portions 57c and 57b, the bottom-surface separation portion 57a, and the first cushion member 79a. By these members, the clean air area CA and the normal air area NA are separated appropriately.

In this embodiment, parts of the cushion member 86, the fan mechanism 45, and the filter block 72 shown in FIG. 9A also function as the division portion.

As shown in FIG. 11, in the clean air area CA, clean air W1 from which dust or the like has been removed by the filter block 72 is sucked in and supplied to the optical system via the first supply port 27a. Air W2 having a high flow rate is supplied to the normal air area NA via the second suction area 71b, and thus the cooling unit is cooled efficiently. By limiting the area to which clean air is to be supplied in this way and dividing the internal space into that area and the area to which normal air can be supplied without a problem, it becomes possible to reduce a load on the filter portion 84 in the filter block 72. In other words, it becomes possible to miniaturize the filter portion 84 (filter block 72) and reduce component costs. Further, it also becomes possible to prolong a lifetime of the filter portion 84.

The filter block 72 is configured to be detachable, and the suction port 72a (first suction area 71a) of the filter block 72 and the first supply port 27a of the image display apparatus 20 oppose each other. In addition, the second suction area 71b and the second supply port 27b of the image display apparatus 20 oppose each other. Therefore, as shown in FIG. 7A, it becomes possible to easily access the first supply port 27a by removing the filter block 72. As a result, it becomes possible to easily carry out maintenance including replacement of a filter provided at the first supply port 27a, and the like without removing the dustproof apparatus 10. It should be noted that the filter cover 33 to be attached to the outer side of the filter is removed and held by the filter cover holding portion 76 inside the top cover 70.

Figure 12:
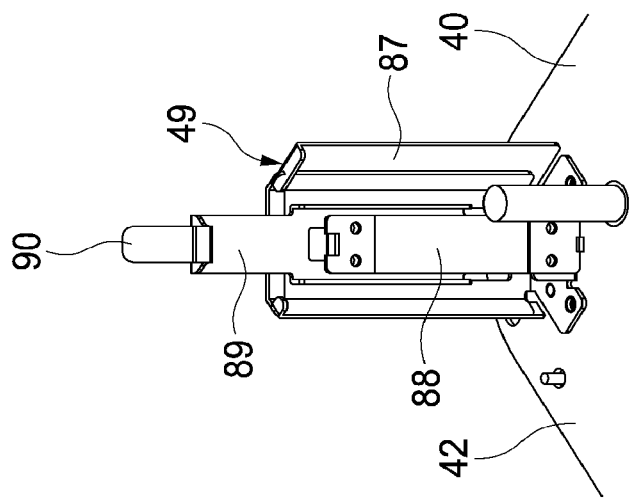
FIGS. 12A and 12B are schematic diagrams respectively showing configuration examples of an engagement portion provided in the top cover and a temporary-fixing mechanism provided in the base portion.
Figure 12:
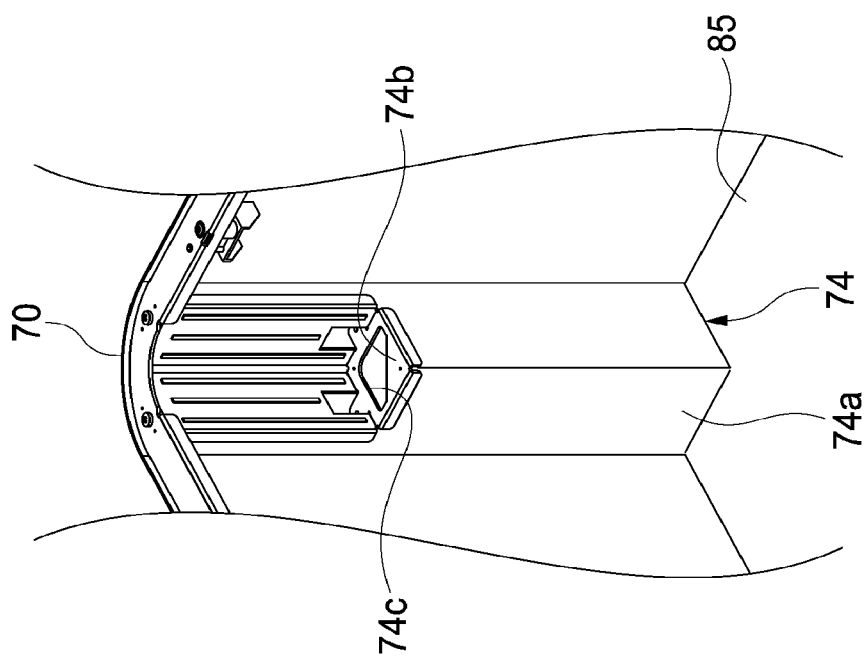

FIGS. 12A and 12B are schematic diagrams showing a configuration example of each of the engagement portions 74 provided in the top cover 70 and the temporary-fixing mechanisms 49 provided in the base portion 40. As shown in FIG. 12A, the engagement portion 74 includes a hollow column portion 74a formed at the corner of the top cover 70 and a triangular engagement hole 74c formed on a main surface 74b of the column portion 74a. The column portion 74a extends in the height direction from the inner surface 85 of the top cover 70. A height thereof is set as appropriate to a position where temporary fixation can be made at a predetermined position by engaging with the temporary-fixing mechanism 49.

As shown in FIG. 12B, the temporary-fixing mechanism 49 includes a fixing plate 87 fixed to the support surface 42 of the base portion 40, a support member (second member) 88 screwed to the fixing plate 87 in the vicinity of the support surface 42, and a movable member (first member) 89 screwed to the support member 88. At a tip end of the movable member 89, a protrusion portion 90 that protrudes from the corner of the base portion 40 toward the center is formed. This direction corresponds to a predetermined direction in this embodiment and will hereinafter be referred to as protrusion direction. The protrusion portion 90 of the temporary-fixing mechanism 49 and the engagement hole 74c of the engagement portion 74 engage with each other, to thus realize temporary fixation of the top cover 70 to the base portion 40.

Figure 13:
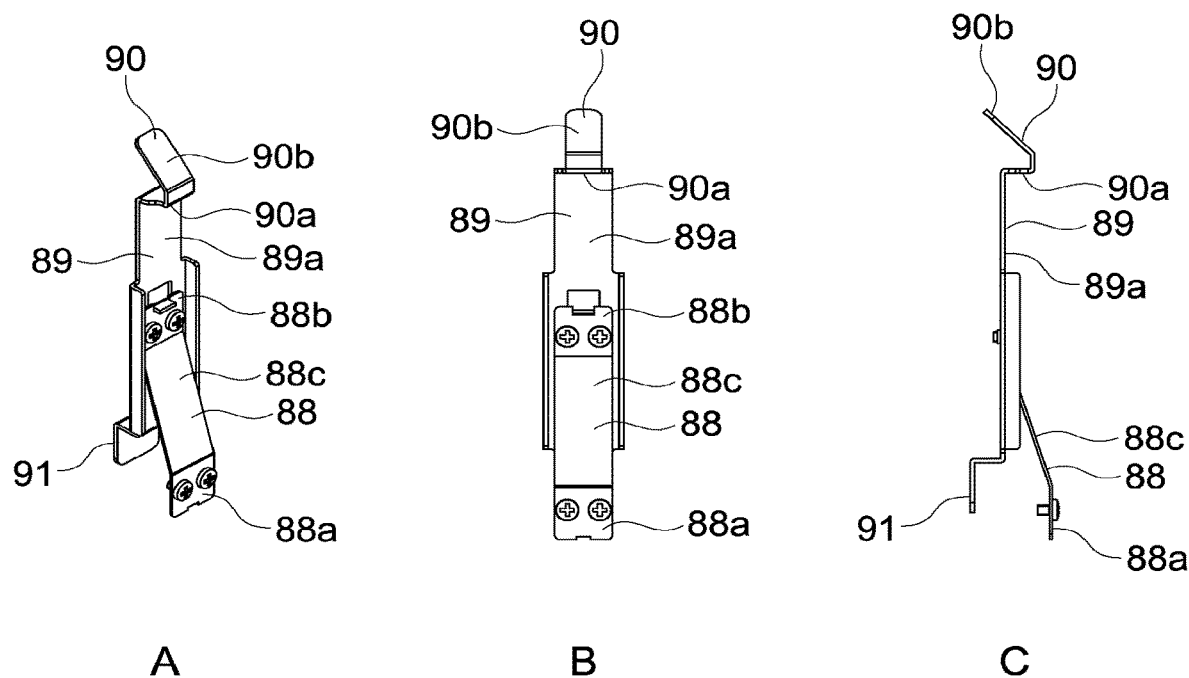
FIGS. 13A to 13C are schematic diagrams showing a configuration example of a support member and movable member of the temporary-fixing mechanism.

FIG. 13 is a schematic diagram showing a configuration example of the support member 88 and the movable member 89. The support member 88 is obtained by deforming a rectangular plate member and includes a lower connection portion 88a to be connected to the fixed plate 87 shown in FIG. 12B, an upper connection portion 88b to be connected to the movable member 89, and an intermediate connection portion 88c that couples them. The lower connection portion 88a and the upper connection portion 88b each extend in the height direction. The intermediate connection portion 88c is formed obliquely in a direction opposite to the protrusion direction. Therefore, the upper connection portion 88b and the movable member 89 connected thereto are arranged more on the outer side than the lower connection portion 88a.

The movable member 89 is formed by deforming a rectangular plate member and includes a center portion 89a connected to the upper connection portion 88b, the protrusion portion 90, and an engagement release portion 91. The upper connection portion 88b is connected by being screwed at substantially the center position of the center portion 89. This position corresponds to a predetermined position in this embodiment and will hereinafter be referred to as connection position.

The protrusion portion 90 is formed while being coupled to an upper (side distant from base portion 40) end portion of the center portion 89. The protrusion portion 90 includes an engagement surface 90a that engages with the engagement hole 74c and a pressing surface 90b that is coupled to the engagement surface 90a. The engagement surface 90a is formed to extend in the protrusion direction from the center portion 89a, and a planar direction thereof is substantially parallel to a planar direction of the support surface 42 of the base portion 40.

The pressing surface 90b is formed by being folded obliquely in an upward direction from a tip end of the engagement surface 90a in the protrusion direction. The pressing surface 90b is a portion that is to be pressed by a part of the main surface 74b of the engagement portion 74. The engagement release portion 91 is formed by being coupled to a lower (side close to base portion 40) end portion of the center portion 89a. The engagement release portion 91 is a portion that is operated by a user.

The movable member 89 is not fixed to the base portion 40 but is screwed to the support member 88 at the center connection position. Therefore, the protrusion portion 90 can move within a predetermined range in the protrusion direction and the opposite direction using the connection position as an axis. For example, when a force is applied to the protrusion portion 90 in a direction opposite to the protrusion direction, the protrusion portion 90 moves in the direction to which the force is applied.

At this time, the upper connection portion 88b and the intermediate connection portion 88c are also slightly deformed in the direction to which the force is applied. As a result, due to rigidity of each of the upper connection portion 88b and the intermediate connection portion 88c, a force is generated in a direction in which the protrusion portion 90 is brought back to its original position, that is, a direction in which the protrusion portion 90 is caused to move in the protrusion direction. In other words, the support member 88 includes a leaf spring structure and is capable of moving the protrusion portion 90 and also biasing, in the protrusion direction, the protrusion portion 90 that has been pressed in the opposite direction.

FIGS. 14A to 14C are schematic diagrams showing an operation example in a case where the engagement portion 74 and the temporary-fixing mechanism 49 engage with each other to be temporarily fixed. First, the top cover 70 is lifted toward the base portion 40 set on the ceiling 1 in a state where the image display apparatus 20 is held. As shown in FIG. 14A, the main surface 74b of the engagement portion 74 comes into contact with the pressing surface 90b of the protrusion portion 90. As shown in FIG. 14B, when the top cover 70 is continuously lifted, the protrusion portion 90 moves in the direction opposite to the protrusion direction in accordance with the pressing against the pressing surface 90b. The main surface 74b moves along the tilted pressing surface 90b, and the pressing surface 90b is inserted into the engagement hole 74c.

When the main surface 74b passes the lower end portion (portion that protrudes most) of the pressing surface 90b, the pressing against the pressing surface 90b is released. As shown in FIG. 14C, the protrusion portion 90 is moved in the protrusion direction by a bias force applied from the support member 88, and thus the engagement surface 90a of the protrusion portion 90 and an inner surface of the engagement hole 74c come into contact with each other. As a result, the protrusion portion 90 and the engagement hole 74c are engaged, and temporary fixation is realized. Therefore, since the temporarily-fixed state is automatically obtained by bringing the top cover 70 close to the base portion 40, extremely high workability is exerted.

Figure 14:
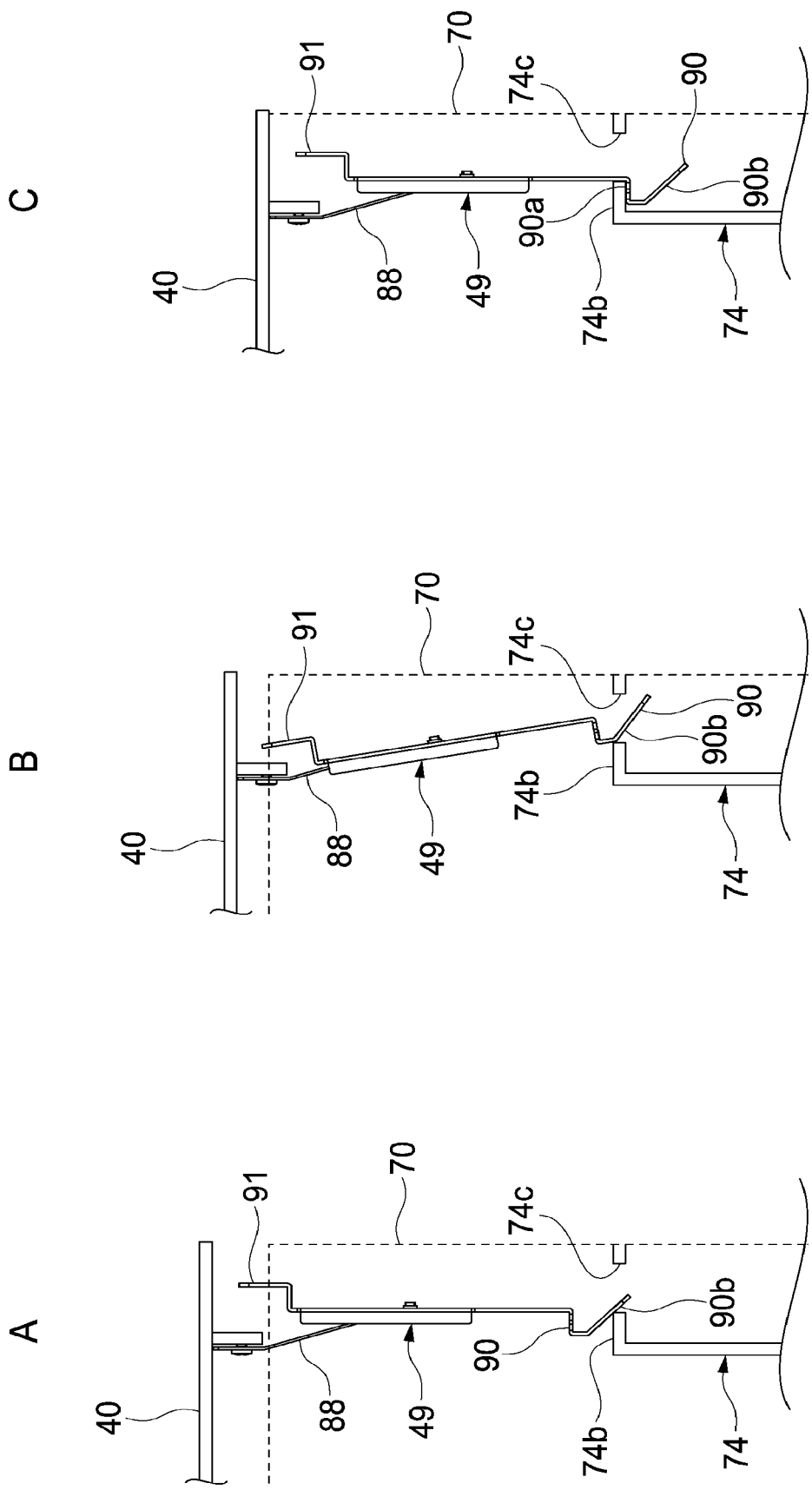
FIGS. 14A to 14C are schematic diagrams showing an operation example when the engagement portion and the temporary-fixing mechanism are engaged to be temporarily fixed.

In the case of removing the top cover 70, it is necessary to release the temporary fixation of the top cover 70 to the base portion 40. The engagement release portion 91 shown in FIGS. 13 and 14 is pressed. As a result, the protrusion portion 90 moves in the direction opposite to the protrusion direction, and the engagement between the protrusion portion 90 and the engagement hole 74c is released. As a result, it becomes possible to easily release the temporary fixation with a simple operation.

Since the temporary fixation is possible in this embodiment, it is possible to safely attach the top cover 70 while preventing it from falling when attaching the top cover 70 to the base portion 40 in a state where the image display apparatus 20 is held. As a result, high workability can be exerted regarding the attachment to the ceiling 1.

The configurations of the engagement portion 74 and the temporary-fixing mechanism 49 are not limited to those described above. For example, other springs, elastic members such as rubber, or the like may be used as a configuration that supports the protrusion portion 90 movably and in a manner in which the protrusion portion 90 can be biased. In addition, an arbitrary configuration for realizing the temporary fixation of the top cover 70 to the base portion 40 may also be adopted.

[Attachment Method of Image Display System]

An example of an attachment method of the image display system 100 will be described. First, the base portion 40 is set on a predetermined surface such that the support legs 54 come into contact with that surface (state as shown in FIG. 4). The image display apparatus 20 is set on the support surface 42 of the base portion 40. This state is, for example, the state shown in FIGS. 9A and 9B (no divisional cushion portion 79). The image display apparatus 20 is sufficiently held by the base unit 40 using the connection metal fitting 51 and the guide metal fitting 56.

In a state where the image display apparatus 20 is held, the base portion 40 is turned over to thus become upside down. The image display apparatus 20 also becomes upside down so that the image display apparatus 20 is supported from above (state as shown in FIGS. 5A and 5B). As shown in FIG. 5A, the ceiling hanger metal fitting 2 is connected to the connection metal fitting 51, and the base portion 40 is attached to the main body portion of the ceiling hanger metal fitting attached to the ceiling 1.

As shown in FIG. 5B, the opening cover 52 is opened, and one or more cables including a power cable and the like are connected to the image display apparatus 20 via the opening 44 (cables are not shown). The cables are inserted into the slits S of the first holding-side cushion 62a of the dustproof structure portion 53, and the opening cover 52 is closed. The power cable and the outlet cable of the AC adapter 55 shown in FIG. 1B are connected to the outlet provided on the ceiling 1. As a result, electric power is supplied to the image display apparatus 20 and the control unit 46 of the dustproof apparatus 10. An operation state of the image display apparatus 20 and an operation state of the fans 58 of the dustproof apparatus 10 may be checked in this state.

The top cover 70 is lifted toward the base portion 40. As shown in FIGS. 14A to 14C, the top cover 70 is automatically temporarily fixed to the base portion 40. Positions of a plurality of screw holes 92 respectively provided at an edge portion of the base portion 40 and an edge portion of the top cover 70 shown FIGS. 4A and 4B are made to coincide, and fixing screws are inserted into the respective screw holes 92. As a result, the attachment of the top cover 70 is completed, and the attachment of the image display system 100 to the ceiling 1 is completed. It should be noted that the fixing screws may be attachable without using tools. Accordingly, the top cover 70 can be easily attached to the base portion 40.

Heretofore, in the image display system 100 according to this embodiment, the connection metal fitting 51 and the guide metal fitting 56 for holding the image display apparatus 20 are provided on the base portion 40 of the dustproof apparatus 10, and the top cover 70 is attached to the base portion 40 in a state where the image display apparatus 20 is held. Accordingly, it becomes possible to set the image display system 100 on the ceiling 1 by a substantially-similar method and sense as in attaching ceiling light, for example. Further, the top cover 70 can also be handled in a manner similar to that for the ceiling light.

For example, as described in Patent Literature 1, in a case where a projector is accommodated in an external casing and these are to be attached to a ceiling hanger metal fitting, the attachment to the ceiling hanger metal fitting needs to be performed while holding the extremely-heavy external casing and projector. As a result, an attachment time becomes long, and a large effort is required for the attachment. In addition, there is a high possibility that the external casing and the projector will fall during the attachment. Furthermore, considering the weight of the external casing and the projector, it is extremely difficult to realize the temporary fixation with a simple configuration.

According to the present technology, it is possible to prevent the problems as described above from occurring and exert extremely-high workability regarding setting of the image display system 100 on the ceiling 1 or the like. Further, since there is no need to hold the image display apparatus 20 by the top cover 70, the top cover 70 can be formed of a resin material, to thus realize weight reduction.

Other Embodiments

The present technology is not limited to the embodiment described above, and various other embodiments can be realized.

The configurations of the base portion and the top cover are not limited to those described above and can be set as appropriate. For example, the fan mechanism may be incorporated in the top cover.

An outlet may be provided in the dustproof apparatus, and the power cable of the image display apparatus may be connected to that outlet. Electric power is supplied to this outlet by the control unit of the dustproof apparatus. By adopting such a configuration, only the outlet cable of the AC adapter needs to be connected to the outlet on the ceiling, so workability regarding the setting is improved. Furthermore, it also becomes possible to judge the driving state of the image display apparatus on the basis of a state of power supply from the control unit.

The dustproof apparatus according to the present technology is also applicable to apparatuses other than the image display apparatus such as a projector. Further, a target on which the image display system according to the present technology is to be set is not limited to the ceiling, and a case where the image display system is set on a lower surface of a predetermined apparatus, or the like is also possible.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) A dustproof apparatus, including:

a base portion including a connection portion to be connected to an external attachment portion and a holding portion that holds an image display apparatus; and a cover portion that includes an inlet, a filter portion provided at the inlet, and an outlet that discharges air sucked in from the inlet, the cover portion being attached to the base portion such that the cover portion covers the image display apparatus held by the holding portion.

(2) The dustproof apparatus according to (1), further including a fan portion provided at the outlet.

(3) The dustproof apparatus according to (1) or (2), further including a division portion that divides an internal space formed by attaching the cover portion to the base portion such that the cover portion covers the image display apparatus, into a first area and a second area different from the first area, in which the inlet includes a first suction area that sucks in the air into the first area and a second suction area that sucks in the air into the second area, and the filter portion is provided in the first suction area of the inlet.

(4) The dustproof apparatus according to (3), in which the image display apparatus includes a first supply port for supplying the air to an optical system including a light source and a second supply port for supplying the air to a cooling unit for cooling the light source, and the division portion performs the division into the first area and the second area such that the first supply port is included in the first area and the second supply port is included in the second area.

(5) The dustproof apparatus according to (3) or (4), in which the filter portion is configured to be detachable from the inlet, the first suction area opposes the first supply port, and the second suction area opposes the second supply port.

(6) The dustproof apparatus according to any one of (1) to (5), in which the base portion includes an opening, an opening cover that covers the opening from an outer side such that a drawing port for drawing out one or more cables connected to the image display apparatus to an outside is formed, and a dustproof structure portion provided at the drawing port.

(7) The dustproof apparatus according to (6), in which the drawing port is formed between a partial circumferential portion of the opening and an opposing portion of the opening cover that opposes the partial circumferential portion, and the dustproof structure portion includes a holding-side cushion member that is provided at the partial circumferential portion and includes one or more slits that respectively nip the one or more cables, and an adhesion-side cushion member that is provided at the opposing portion of the opening cover and adheres tightly to the holding-side cushion member.

(8) The dustproof apparatus according to (7), in which the holding-side cushion member includes a first holding-side cushion that has a substantially-cuboid shape, includes the one or more slits that are formed from an upper surface toward a lower surface, aligned in a longitudinal direction, and extend in a short-side direction, and is arranged such that the short-side direction is set in a direction that is directed from the drawing port toward the outside, and a second holding-side cushion that has a substantially-cuboid shape in which a size thereof in the longitudinal direction is substantially equal to that of the first holding-side cushion, and is arranged adjacently along an outer-side side surface of the first holding-side cushion, and the adhesion-side cushion member adheres tightly to an upper surface of each of the first holding-side cushion and the second holding-side cushion.

(9) The dustproof apparatus according to (8), in which a height of the upper surface of the second holding-side cushion is smaller than a height of the upper surface of the first holding-side cushion and larger than a height of a lower end of the one or more slits formed in the first holding-side cushion.

(10) The dustproof apparatus according to any one of (1) to (9), in which the cover portion includes one or more engagement portions, and the base portion includes one or more temporary-fixing portions that engage with the one or more engagement portions to temporarily fix the cover portion.

(11) The dustproof apparatus according to (10), in which the temporary-fixing portion includes a first member including a protrusion portion that includes an engagement surface that engages with the engagement portion and a pressing surface that is pressed by the engagement portion, and protrudes in a predetermined direction, and a second member that supports the first member such that, at a predetermined position of the first member, the protrusion portion is movable in a direction opposite to the predetermined direction when the pressing surface is pressed, and the protrusion portion is movable in the predetermined direction such that the engagement surface engages with the engagement portion when the press by the engagement portion is released.

(12) The dustproof apparatus according to (11), in which the first member includes an engagement release portion capable of pressing the protrusion portion that engages with the engagement portion to move the protrusion portion to a side opposite to the predetermined direction.

(13) The dustproof apparatus according to any one of (1) to (12), further including a fan portion provided at the outlet, a control unit that controls drive of the fan portion, and a sensor unit capable of measuring each of a first temperature of the air in a vicinity of the inlet and a second temperature of the air in a vicinity of the outlet, in which the control unit controls the drive of the fan portion on a basis of a difference between the first temperature and the second temperature measured by the sensor unit.

(14) The dustproof apparatus according to any one of (1) to (13), in which the cover portion includes an openable/closable projection cover portion that covers a projection unit of the image display apparatus.

REFERENCE SIGNS LIST

CA Clean air area
NA normal air area
S slit
1 ceiling
2 ceiling hanger metal fitting
10 dustproof apparatus
20 image display apparatus
23 projection unit
27 inlet
27a first supply port
27b second supply port
28 outlet
40 base portion
43 holding mechanism
44 opening
44a circumferential portion
45 fan mechanism
46 control unit
48 sensor unit
49 temporary-fixing mechanism
51 connection metal fitting
52 opening cover
52b opposing portion
53 dustproof structure portion
57 air separation portion 61 drawing port
62 holding-side cushion member
62a first holding-side cushion
62b second holding-side cushion
63 adhesion-side cushion member
70 top cover
71 inlet
71a first suction area
71b second suction area
72 filter block
73 outlet
74 engagement portion
74c engagement hole
75 front cover
79 divisional cushion portion
84 filter portion
86 cushion member
88 support member
89 movable member (first member)
90 protrusion portion
90a engagement surface
90b pressing surface
91 engagement release portion
100 image display system

The invention claimed is:

1. A dustproof apparatus, comprising:
a base portion including a connection portion to be connected to an external attachment portion and a holding portion that holds an image display apparatus;
a cover portion that includes an inlet, a filter portion provided at the inlet, and an outlet that discharges air sucked in from the inlet; and
a division portion that divides an internal space formed by attaching the cover portion to the base portion such that the cover portion covers the image display apparatus, into a first area and a second area different from the first area,
wherein the filter portion is detachably attached to the cover portion,
wherein the cover portion is configured to be attached to the base portion such that the cover portion covers the image display apparatus held by the holding portion,
wherein the inlet includes a first suction area that sucks in the air into the first area and a second suction area that sucks in the air into the second area, and
wherein the filter portion is provided in the first suction area of the inlet.

2. The dustproof apparatus according to claim 1, further comprising
a fan portion provided at the outlet.

3. The dustproof apparatus according to claim 1, wherein
the image display apparatus includes a first supply port for supplying the air to an optical system including a light source and a second supply port for supplying the air to a cooling unit for cooling the light source, and
the division portion performs the division into the first area and the second area such that the first supply port is included in the first area and the second supply port is included in the second area.

4. The dustproof apparatus according to claim 3, wherein
the filter portion is configured to be detachable from the inlet,
the first suction area opposes the first supply port, and
the second suction area opposes the second supply port.

5. The dustproof apparatus according to claim 1, wherein
the base portion includes an opening, an opening cover that covers the opening from an outer side such that a drawing port for drawing out one or more cables connected to the image display apparatus to an outside is formed, and a dustproof structure portion provided at the drawing port.

6. The dustproof apparatus according to claim 5, wherein
the drawing port is formed between a partial circumferential portion of the opening and an opposing portion of the opening cover that opposes the partial circumferential portion, and
the dustproof structure portion includes a holding-side cushion member that is provided at the partial circumferential portion and includes one or more slits that respectively nip the one or more cables, and an adhesion-side cushion member that is provided at the opposing portion of the opening cover and adheres tightly to the holding-side cushion member.

7. The dustproof apparatus according to claim 6, wherein
the holding-side cushion member includes
a first holding-side cushion that has a substantially-cuboid shape, includes the one or more slits that are formed from an upper surface toward a lower surface, aligned in a longitudinal direction, and extend in a short-side direction, and is arranged such that the short-side direction is set in a direction that is directed from the drawing port toward the outside, and
a second holding-side cushion that has a substantially-cuboid shape in which a size thereof in the longitudinal direction is substantially equal to that of the first holding-side cushion, and is arranged adjacently along an outer-side side surface of the first holding-side cushion, and
the adhesion-side cushion member adheres tightly to an upper surface of each of the first holding-side cushion and the second holding-side cushion.

8. The dustproof apparatus according to claim 7, wherein
a height of the upper surface of the second holding-side cushion is smaller than a height of the upper surface of the first holding-side cushion and larger than a height of a lower end of the one or more slits formed in the first holding-side cushion.

9. The dustproof apparatus according to claim 1, wherein
the cover portion includes one or more engagement portions, and
the base portion includes one or more temporary-fixing portions that engage with the one or more engagement portions to temporarily fix the cover portion.

10. The dustproof apparatus according to claim 9, wherein
the temporary-fixing portion includes
a first member including a protrusion portion that includes an engagement surface that engages with the engagement portion and a pressing surface that is pressed by the engagement portion, and protrudes in a predetermined direction, and
a second member that supports the first member such that, at a predetermined position of the first member, the protrusion portion is movable in a direction opposite to the predetermined direction when the pressing surface is pressed, and the protrusion portion is movable in the predetermined direction such that the engagement surface engages with the engagement portion when the press by the engagement portion is released.

11. The dustproof apparatus according to claim 10, wherein
the first member includes an engagement release portion capable of pressing the protrusion portion that engages with the engagement portion to move the protrusion portion to a side opposite to the predetermined direction.

12. The dustproof apparatus according to claim 1, further comprising
a fan portion provided at the outlet,
a control unit that controls drive of the fan portion, and
a sensor unit capable of measuring each of a first temperature of the air in a vicinity of the inlet and a second temperature of the air in a vicinity of the outlet, wherein
the control unit controls the drive of the fan portion on a basis of a difference between the first temperature and the second temperature measured by the sensor unit.

13. The dustproof apparatus according to claim 1, wherein the cover portion includes an openable/closable projection cover portion that covers a projection unit of the image display apparatus.

14. An image display system, comprising:
an image display apparatus; and
a dustproof apparatus including
    a base portion including a connection portion to be connected to an external attachment portion and a holding portion that holds an image display apparatus,
    a cover portion that includes an inlet, a filter portion provided at the inlet, and an outlet that discharges air sucked in from the inlet, and
    a division portion that divides an internal space formed by attaching the cover portion to the base portion such that the cover portion covers the image display apparatus, into a first area and a second area different from the first area,
wherein the filter portion is detachably attached to the cover portion,
wherein the cover portion is configured to be attached to the base portion such that the cover portion covers the image display apparatus held by the holding portion,
wherein the inlet includes a first suction area that sucks in the air into the first area and a second suction area that sucks in the air into the second area, and
wherein the filter portion is provided in the first suction area of the inlet.

15. An attachment method, comprising:
causing a holding portion of a base portion of a dustproof apparatus to hold an image display apparatus;
connecting a connection portion of the base portion to an external attachment portion; and
attaching a cover portion of the dustproof apparatus that includes an inlet, a filter portion provided at the inlet and detachably attached to the cover portion, and an outlet that discharges air sucked in from the inlet, to the base portion such that the cover portion covers the image display apparatus held by the holding portion,
wherein the dustproof apparatus includes a division portion that divides an internal space formed by attaching the cover portion to the base portion such that the cover portion covers the image display apparatus, into a first area and a second area different from the first area,
wherein the inlet includes a first suction area that sucks in the air into the first area and a second suction area that sucks in the air into the second area, and
wherein the filter portion is provided in the first suction area of the inlet.

* * * * *